(12) United States Patent
Taha et al.

(10) Patent No.: US 12,710,087 B2
(45) Date of Patent: Aug. 18, 2026

(54) 3D PRINTED VISCOELASTIC DAMPERS AND METHODS OF MAKING

(71) Applicant: UNM Rainforest Innovations, Albuquerque, NM (US)

(72) Inventors: Mahmoud Reda Taha, Albuquerque, NM (US); Mohammed Jaradat, Albuquerque, NM (US); Eslam Soliman, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 379 days.

(21) Appl. No.: 18/333,501

(22) Filed: Jun. 12, 2023

(65) Prior Publication Data

US 2023/0400083 A1 Dec. 14, 2023

Related U.S. Application Data

(60) Provisional application No. 63/351,093, filed on Jun. 10, 2022.

(51) Int. Cl.
*F16F 15/02* (2006.01)
*F16F 13/04* (2006.01)

(52) U.S. Cl.
CPC ............ *F16F 15/022* (2013.01); *F16F 13/04* (2013.01); *F16F 2224/0241* (2013.01); *F16F 2228/066* (2013.01)

(58) Field of Classification Search
CPC .. F16F 15/022; F16F 13/04; F16F 2224/0241; F16F 2228/066
USPC ....................... 267/151–153; 52/167.1–167.9
See application file for complete search history.

(56) References Cited

U.S. PATENT DOCUMENTS 5,201,155 A * 4/1993 Shimoda ............... E01D 19/041 248/634
5,946,866 A * 9/1999 Weglewski ............... F16F 1/40 52/167.7
6,141,919 A * 11/2000 Robinson .................. F16F 7/08 52/573.1
7,090,911 B2 * 8/2006 Lascelles ............. B32B 27/304 52/782.1
7,172,800 B2 * 2/2007 Boss ....................... B32B 7/022 720/716
9,511,571 B2 * 12/2016 Montgomery .......... B29C 70/08

FOREIGN PATENT DOCUMENTS

EP 2409029 B1 * 7/2013 ............ F03D 80/00

* cited by examiner

*Primary Examiner* — Christopher P Schwartz
(74) *Attorney, Agent, or Firm* — Keith A. Vogt; Keith Vogt, Ltd.

(57) ABSTRACT

Dampers made from polymers modified with nanomaterials (e.g. carbon nanotubes). This novel viscoelastic material has significantly improved damping characteristics making nano-modified polymers excellent materials for viscoelastic dampers, including highly customizable materials and geometries tailored to achieve good damping properties and proper shear stiffness and shear capacity.

8 Claims, 17 Drawing Sheets

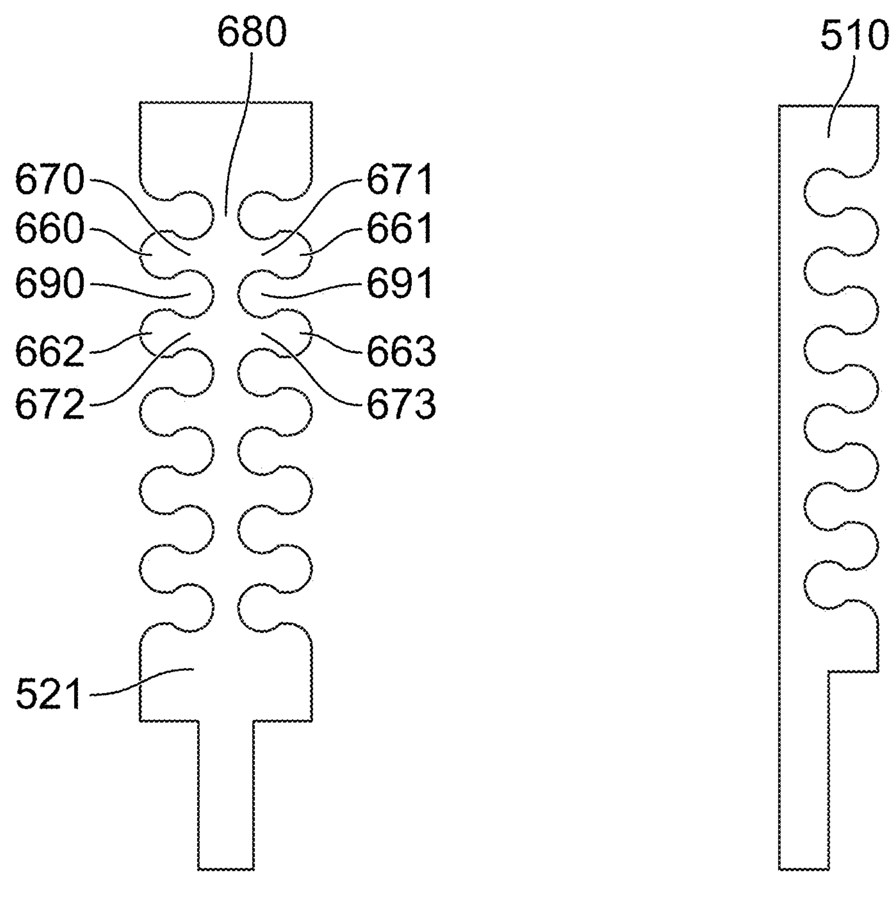
FIG. 5A
FIG. 5B
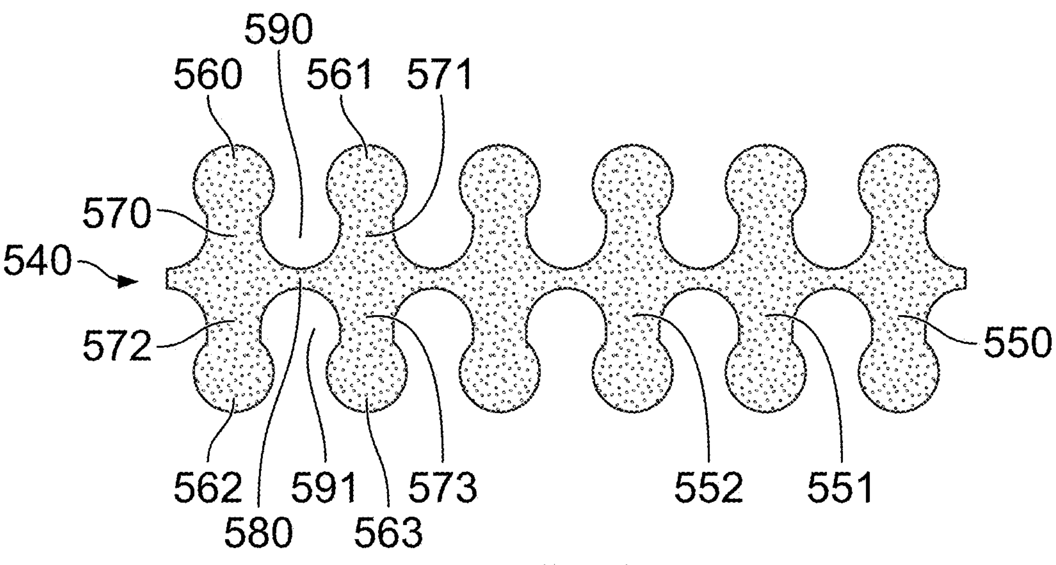
FIG. 5C

3D PRINTED VISCOELASTIC DAMPERS AND METHODS OF MAKING

RELATED APPLICATIONS

This application claims priority to U.S. Provisional Application No. 63/351,093, filed on Jun. 10, 2022, which is incorporated herein in its entirety.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

Conventional viscoelastic damping devices induce a viscous shear force in response to relative inter-story drift, causing energy dissipation. The performance and characteristics of viscous dampers are governed by the viscoelastic properties of the material used. FIG. 1 is an illustration of a conventional viscoelastic damping device forming a composite consisting of an inner plate 100, viscoelastic material 110, and outer plates 120.

The principal function of a passive energy dissipation device is to reduce the inelastic energy dissipation demand on the structural framing system during extreme loading events such as earthquakes. Different designs of viscous dampers can be incorporated within frame bracing.

Current designs typically include very thin layer of viscoelastic material to maximize stiffness and shear capacity. This, in turn, limits damping characteristics.

BRIEF SUMMARY OF THE INVENTION

In one embodiment, the present invention provides dampers made from polymers modified with nanomaterials (e.g. carbon nanotubes). This novel viscoelastic material has significantly improved damping characteristics making nano-modified polymers excellent materials for viscoelastic dampers.

In another embodiment, the present invention provides highly customizable materials and geometries tailored to achieve good damping properties and proper shear stiffness and shear capacity.

In another embodiment, the present invention provides viscoelastic dampers that are lightweight and have a very high shear area compared with conventional viscous dampers.

In another embodiment, the present invention provides viscoelastic dampers using design materials ad hoc for the specific application and integrated using 3D printing technology.

In another embodiment, the present invention provides viscoelastic dampers using engineered materials and geometry to obtain desired performance characteristics and specifically maximizing energy dissipation during extreme loading events.

In another embodiment, the present invention provides 3D printed viscous dampers with high energy dissipation mechanisms developed for extreme loading events (e.g. earthquakes).

In another embodiment, the present invention provides viscous dampers made from nano-modified polymer materials with carefully selected synthetic fibers (e.g. carbon fibers) using 3D printing technology to integrate nonlinear material and deformation energy dissipation to maximize energy dissipation during extreme loading events (e.g. seismic loading).

In another embodiment, the present invention provides viscous dampers that use bioinspired microstructural damper geometry designed to maximize deformation energy under high strain loading while maintaining appropriate shear stiffness and shear capacity.

In another embodiment, the present invention provides viscous dampers having high energy dissipation created through careful selection of polymer, fibers and microstructure geometry and the integration of the above elements using 3D printing technology.

In another embodiment, the present invention provides viscous dampers that may be sacrificed during a seismic event and can be replaced after the event.

In another embodiment, the present invention provides a mechanically interlocked viscoelastic damping (MIVED) device where the energy is dissipated through materials, multiple modes of deformations, and geometric nonlinearities of the Thermoplastic polyurethane (TPU) part.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and is not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

FIG. 5A shows a center plate for a MIVED of an embodiment of the present invention.

FIG. 5B shows a flange for a MIVED of an embodiment of the present invention.

FIG. 5C shows a viscoelastic part for a MIVED of an embodiment of the present invention.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure, or system. Further, the terms and phrases used herein are not intended to be limiting, but rather to provide an understandable description of the invention.

Figure 1:
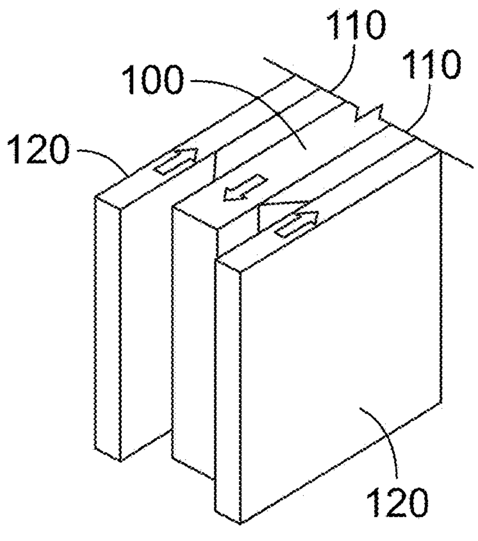
FIG. 1 shows a prior art dampener.

The energy dissipated from a solid nano-modified polymer used as an inner plate, as shown in FIG. 1, does not create effective damping and does not provide appropriate shear stiffness and shear capacity. To overcome this limitation, the present invention provides additional energy dissipation mechanisms to maximize energy dissipation.

Figure 2:
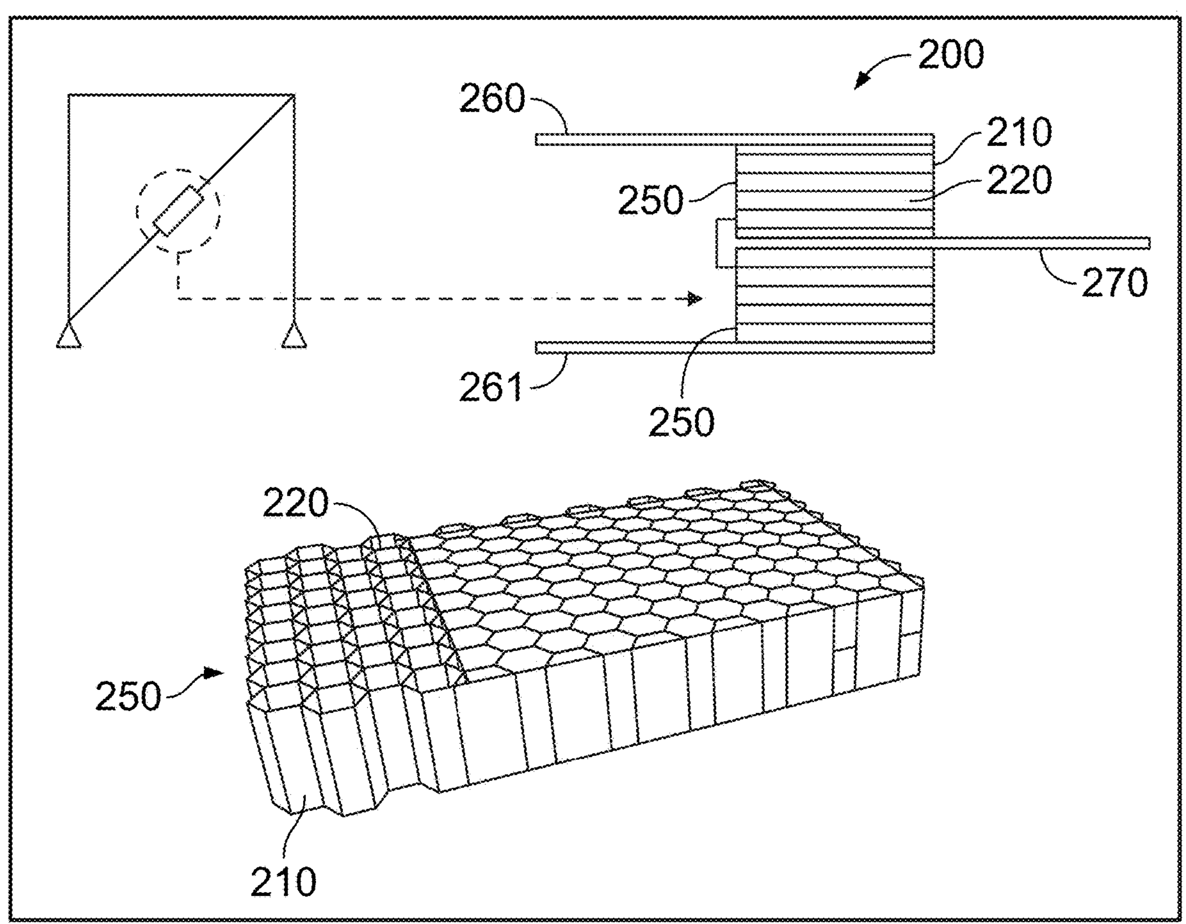
FIG. 2 shows an embodiment of the present invention.

In a preferred embodiment, as shown in FIG. 2, the present invention provides an energy dissipation mechanism 200 created using 3D printing technology. More specifically, the present invention provides viscoelastic dampers by integrating 3D printed fiber geometry 210 with nano-modified polymer matrix 220. In a preferred embodiment, 3D printed fiber geometry 210 may be in the form of a housing or framework that defines a plurality of openings or cells which are filled with nano-modified polymer matrix 220. Fiber geometry 210 when filled with nano-modified polymer matrix 220 forms dampener 250.

FIG. 2 depicts another embodiment of the present invention. The embodiment concerns an energy dissipation mechanism 200 that includes a first outer plate 260 and a second outer 261. An inner plate 270 is located in between said outer plates. Sandwiched in between the plates are dampeners 250. Inner plate 270 may further be connected to a bracing system.

In another embodiment, energy dissipation mechanism 200 includes outer plate 260 (a first plate), inner plate 270 (a second plate) and dampener 250. In this embodiment, dampener 250 is sandwiched in between the plates 260 and 270.

This invention will allow integrating viscous energy dissipation mechanism created from the viscoelastic behavior of nano-modified polymer matrix 220 which may be comprised of nonlinear material and the high deformation energy created from specially designed 3D printed fiber geometry having a nonlinear geometry. In addition, the stiff 3D printed geometry will enable providing appropriate shear stiffness and shear capacity to carry dynamic loads.

In other embodiments, the present invention concerns a new generation of viscous dampers created by integrating 3D printed fiber geometry that defines cells or openings that may be uniform or of other predetermined configurations. The cells or openings are filled with nano-modified polymer matrix. The embodiments may include an integrated viscous energy dissipation mechanism created from the viscoelastic behavior of the nano-modified polymer matrix (material nonlinearity) and the high deformation energy created from specially designed 3D printed fiber geometry (geometric nonlinearity).

In addition, the stiff 3D printed geometry will enable providing appropriate shear stiffness and shear capacity to carry dynamic loads.

Mechanically Interlocked Viscoelastic Damper (MIVED)

Figure 3:
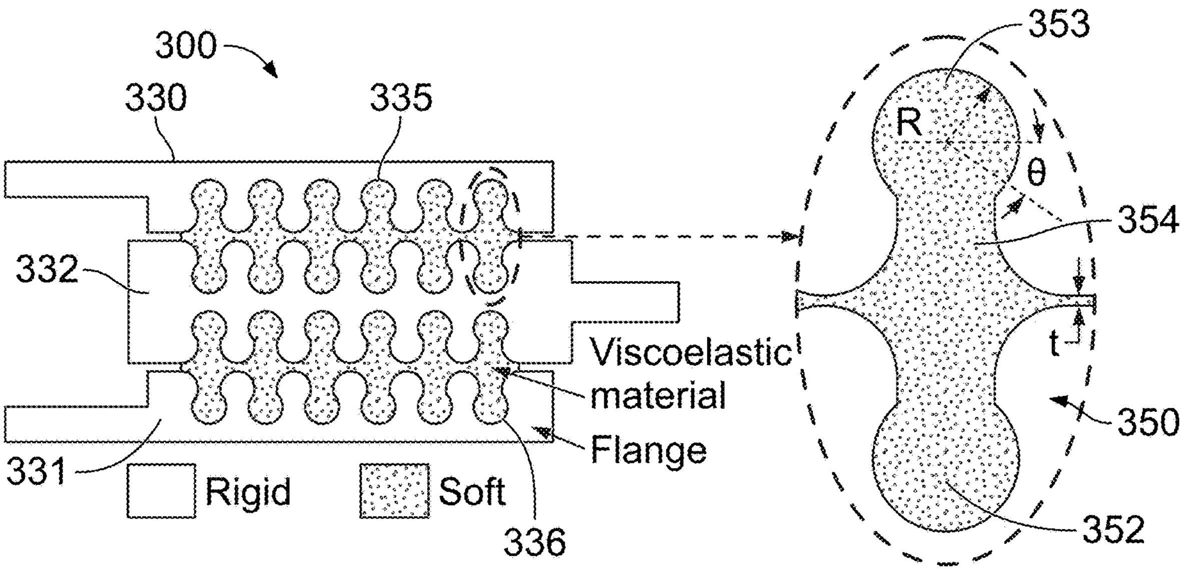
FIG. 3 shows another embodiment of the present invention.

In other embodiments, the present invention concerns a mechanically interlocked viscoelastic damper (MIVED) 300 consisting of rigid and soft phases that are mechanically interlocked without chemical adhesion or bond. As shown in FIG. 3, MIVED 300 includes a first outer plate 330, second outer plate 331, center plate 332 and viscoelastic material 335 and 336. Plates 330-332 and viscoelastic material 335 and 336 are interlocked together. In a preferred embodiment, plates 330-332 and viscoelastic material 335 and 336 are interlocked together in a jigsaw-like interlocking pattern design as shown in FIG. 3.

Viscoelastic material 335 and 336 enable uniform transmission of forces, high relative movements, and plastic deformations between hard objects, thus providing a robust mechanism for energy absorption.

The jigsaw-like interlocking pattern is utilized to connect the rigid and soft phases of the device. The rounded features 352 and 353 connected by a central portion 354 of the jigsaw 350 help in minimizing premature failure due to local stress concentrations in the rigid material, thus presenting global failure due to applied loads. The parameters that characterize the jigsaw interlocking pattern can be studied by isolating an individual cell of the repeating pattern, as shown in FIG. 3.

Figure 4:
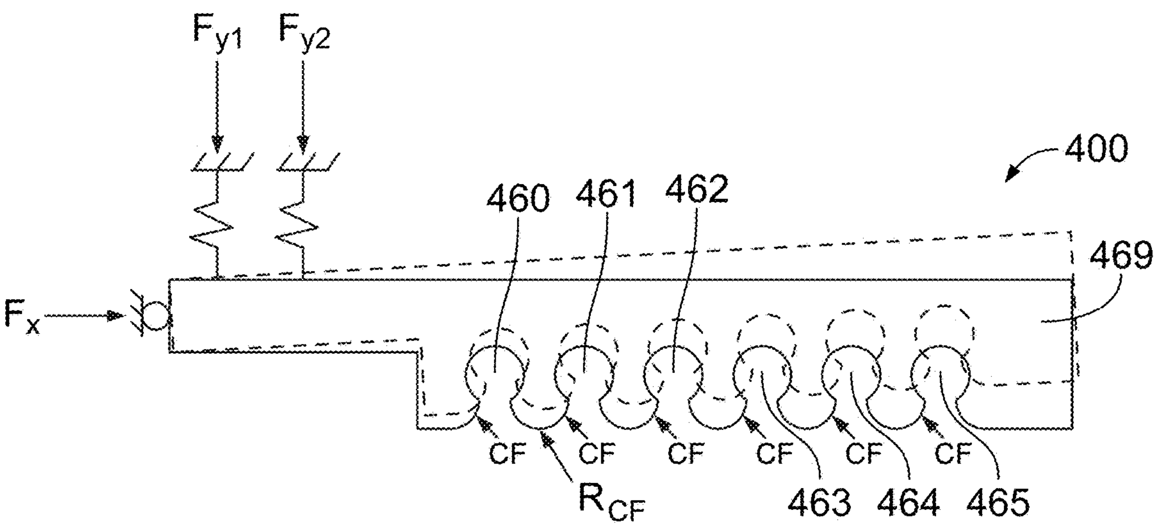
FIG. 4 shows the contact forces acting on a MIVED of an embodiment of the present invention.

As shown in FIG. 4, the parameters are the radius (R), the angle between centers of adjacent jigsaw joints (θ), and the thickness of the interlocking pattern (t). The imposed displacements on dampener 400 cause the development of contact forces (CF) due to the soft phase material pushing against the hard phase material, as seen in FIG. 4. The resultant of the contact forces ($R_{CF}$) causes the flanges 460-465 to rotate in rigid body 469 motion, because of the similarly shaped opening in the rigid body, due to eccentricity of loading and the enforced boundary conditions. The roller at the flange suppresses displacements in the horizontal direction through $F_x$. At the same time, the two springs limit displacements in the vertical direction through $F_{y1}$ and $F_{y2}$, where $F_{y1}>F_{y2}$, and thereby allowing the device to rotate about the out-of-plane axis. Due to this rotation, the device is allowed to reach high levels of displacement in the horizontal direction without failure in the soft phase. On the other hand, the center plate stays in place because of the symmetry of the contact forces acting on it from both sides.

The extent of the soft phase deformation is a result of the degree of fixity at the flanges, the interlocking pattern, and the choice of material for both rigid and soft phases of the device. This combination governs the deformation by controlling the orientation of the contact forces and the amount of rotation of the device. Additionally, the rotation leads to multiple modes of deformation, such as uniaxial, biaxial, and shear, in the soft phase. Thus, the single-mode normalization of displacements of the soft viscoelastic phase into a measure like strain is not possible. Therefore, the design of the device is dependent on how much it would be displaced during load application. This is contrary to conventional VEDs where only shear deformations take place, and shear strain is used as a normalized displacement measure.

Figure 5D:
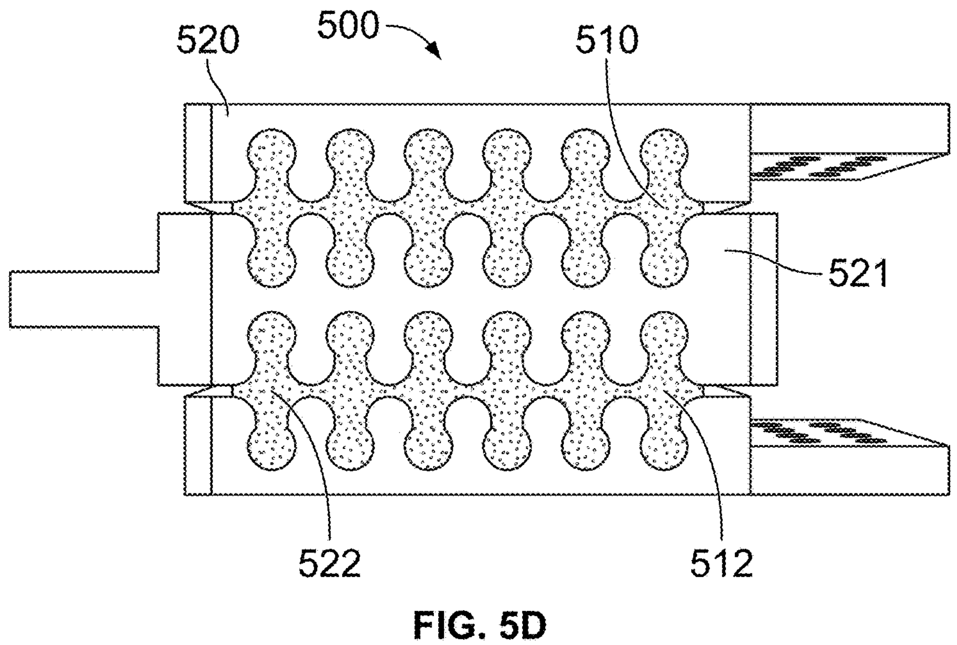
FIG. 5D shows a MIVED of an embodiment of the present invention.

As shown in FIGS. 5A-5D, in one preferred embodiment, MIVED 500 is assembled by inserting the soft viscoelastic parts 510 and 512 into the rigid parts 520-522 along the out-of-plane direction of the damper. The thickness of the device or the out-of-plane dimension is 58 mm. As shown in FIG. 5C, viscoelastic part 540 includes a plurality of interconnected segments 550-552. Each segment includes rounded ends 560-563 connected by a central body 570-573. Opposingly located central bodies, such as 570 and 573 as well as 571 and 572 along with interconnecting segment or spacer 580 all included curved sections that define openings 590 and 591 which match the configuration of a rounded end such as 560 and central body 570. Interconnecting segment or spacer 580 is repeated in the chain of flanges and is used to connect the flanges together.

The solid sections such as 510 and 521 are configured to define projections such as 610 and 612 which form a plurality of interconnected segments. Each segment includes rounded ends 660-663 connected by a central body 670-673. Opposingly located central bodies, such as 670 and 673 as well as 671 and 672 along with interconnecting segment 680 all included curved sections that define openings 690 and 691 which match the configuration of a rounded end such as 560 and central body 570 of the viscoelastic material.

To study the mechanical response of the MIVED, first the soft material was mechanically characterized, and its energy dissipation was assessed. The material used in this study for the soft phase of the MIVED is NinjaFlex® which is commercially available in spools with a filament diameter of 1.75 mm. The material supplier for the TPU spools was NinjaTek (Manheim, PA, USA). This material is a polyester-based TPU that has a durometer shore hardness of 85A. The TPU was 3D-printed to benefit from the several advantages 3D-printing offers such as high production speed, low cost, and high precision manufacturing. A single-step process was employed to 3D-print the TPU. To explore the effect of the distinct microstructures and material properties of the 3D-printed TPU, the effects of the 3D-printing infill pattern and loading rate on the mechanical response was investigated. Table 1 presents the properties of the feedstock material as provided by the material supplier.

TABLE 1

NinjaFlex properties as provided by the material supplier

| Property | Value |
|---|---|
| Ultimate tensile strength (MPa) | 26 |
| Elongation at break (%) | 660 |
| Young's modulus (MPa) | 12 |
| Toughness (m * N/m$^3$) | 82.7 |

The 3D printer used to produce specimens is the industrial 3D printer AON-M2 supplied by AON3D (Montreal, QC, Canada). To determine printing process parameters, initial parameters were obtained based on prior published work of 3D-printed TPU produced via FFF. Based on the selected initial parameters, a range of printing speeds, layer heights, and temperatures were examined and adjusted to achieve high extrusion density without compromising the integrity of the printed parts. The printing process parameters used for the material extrusion are listed in Table 2.

TABLE 2

Printing Process Parameters

| Parameter | Value |
|---|---|
| Nozzle diameter (mm) | 0.8 |
| Layer height (mm) | 0.2 |
| Infill (%) | 100 |
| Extrusion Multiplier | 1.2 |
| Extruder temperature (° C.) | 240 |
| chamber temperature (° C.) | 60 |
| Speed (mm/s) | 20 |

Figure 6:
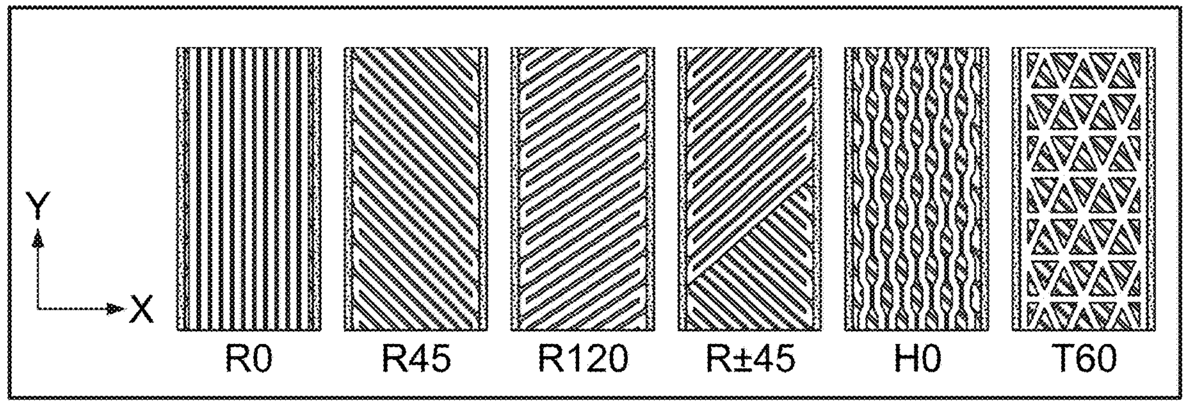
FIG. 6 shows infill patterns of 3D-printed TPU.

The examined infill patterns are shown in FIG. 6, with Y-axis being the loading direction. The specimen's name consists of a letter followed by a number representing the infill pattern and angle orientation of deposited layers with respect to the loading direction, respectively. The infill patterns used are rectilinear (R), honeycomb (H), and triangular (T). The rectilinear pattern was printed at different angles to study the effect of angle orientation. In addition, the R±45 was printed to explore the effect of having two different angles of layers deposited within the same specimen. The T60 and H0 were printed to check whether geometrical patterns other than rectilinear have an influence over mechanical properties.

Two tests were used to characterize TPU materials: uniaxial-cyclic and stress relaxation tension tests. The tensile tests and stress relaxations tests were conducted according to ASTM D412 and ASTM D6048-07, respectively. A wider range of loading rates was employed in this study to examine the effect of the loading rate in the response of 3D-printed TPU. The uniaxial-cyclic tension testing was carried out to investigate the effect of the distinct filament-based microstructure of 3D-printed TPU on mechanical properties and energy dissipation capacity through the hysteresis curve resulting from the loading-unloading sequence. In addition, specimens with different infill patterns and at different loading rates were tested to investigate the effects of anisotropy and loading rate, respectively. Stress relaxation tests were then conducted on one chosen infill pattern to determine the viscoelastic properties needed to numerically model the material. All the mechanical testing was performed to an upper strain value of 100%. Strains were measured using digital image correlation (DIC) by tracking two points on the surface of the TPU specimen and calculating the change in distance between them. Five specimens for each infill pattern were tested.

For the uniaxial-cyclic tension test, a displacement-controlled test was conducted at two crosshead speed 5 mm/s and 18 mm/s which correspond to a strain rate of 0.055 $s^{-1}$ and 0.200 $s^{-1}$, respectively. The test was conducted using MTS® Bionix servohydraulic system that is equipped with a 25 kN load cell with a resolution of 1 N. All the tests were performed in cyclic loading using a ramp function. The specimens were straight rectangular specimens with a uniform cross-sectional area (105 mm length; 15 mm width; 3.2 mm thickness), which is permitted by the ASTM D6048-07 standard.

Prior to uniaxial testing, the mass of each specimen was measured and recorded in Table 2. Due to the mass difference across the different patterns, all the mechanical properties were normalized by their respective specimen mass. To evaluate the statistical significance of the normalized properties a complete randomized design is applied in this study to assess the data. The design consists of two factors: rate and pattern with a total of three levels of treatment corresponding to each mechanical property. A fixed-effect two-factor Analysis of Variance (ANOVA) model was used to analyze the data with a significance level of significance ($\alpha$=0.05).

TABLE 3

Mass of specimens of different infill patterns

| Infill pattern | Mass (g) ± standard deviation |
|---|---|
| R45 | 5.90 ± 0.20 |
| R120 | 5.84 ± 0.18 |
| R0 | 5.85 ± 0.13 |
| R ± 45 | 5.90 ± 0.32 |
| T60 | 5.44 ± 0.28 |
| H0 | 5.21 0.15 |

Finally, single-step relaxation tests were conducted by first applying a uniaxial tension at a high displacement rate of 60 mm/s until a fixed strain value of 100% was reached. This rate was the highest displacement rate that can be obtained by the testing equipment. This following ASTM D6048-07 standard which recommends that the deformation shall be imposed as instantaneously as possible in relaxation tests. The recommendation help minimize the viscoelastic effects during the loading ramp up. The strain value was then sustained for a period of 100 seconds.

Figure 7:
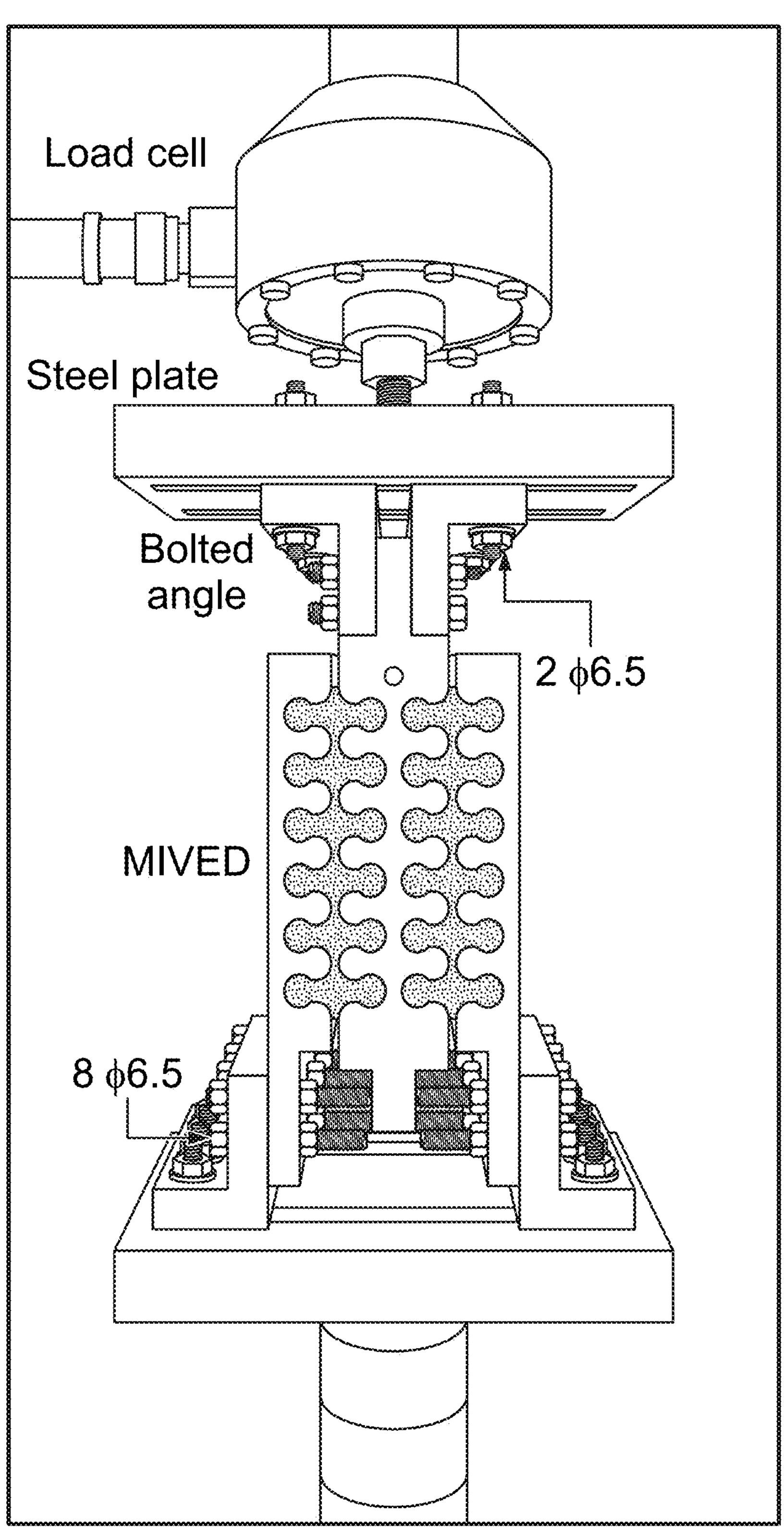
FIG. 7 shows a MIVED test set up.

The soft interlocking TPU part was printed using the parameters in Table 1. The R45 infill pattern was used to print the part based on the results of the tested TPU specimens. The rigid phase of the device was fabricated from grade 1018 steel using conventional machining methods. The test setup, shown in FIG. 7, was fabricated to test the MIVED. The flanges of the MIVED are bolted to steel brackets which in turn are bolted to steel plates that are attached to the UTM using a pin connection at the top and bottom. The loading protocol of the MIVED, summarized in Table 3, enables evaluating the device in different vibrational scenarios. The test program covers displacement amplitudes ranging from 1.0 mm to 5.0 mm and a frequency range between 0.05 Hz and 0.5 Hz. This imposed displacement range covers a wide range of shear strain corresponds to 10% to 100%. This imposed frequency range represents a low-frequency vibration typically observed by a wide spectrum of buildings under seismic events. The specified frequency and amplitude ranges were employed previously in literature when evaluating VEDs. The rigid body rotations of the flanges are allowed by choosing a semi-rigid single-angle all-bolted connection with only two bolts at the outstanding leg. This connection allows for load eccentricity to impose a rigid body deformation at the outstanding leg in the form of rotation about the lower end of the angle. If a fully fixed connection was used, it would not have allowed flange rotations and, therefore, only shear deformations would have been sustained by the viscoelastic part. DIC was used to track the movement of the flanges to study the behavior of the device.

TABLE 4

MIVED testing program

| Amplitude (mm) | Number of cycles | Shear strain (mm/mm) | Frequency (Hz) |
|---|---|---|---|
| ±1 | 10 | 0.1 | 0.05, 0.15, 0.3, 0.5 |
| ±3 | 10 | 0.6 | 0.05, 0.15, 0.3, 0.5 |
| ±5 | 10 | 1 | 0.05, 0.15, 0.3, 0.5 |

Figure 8A:
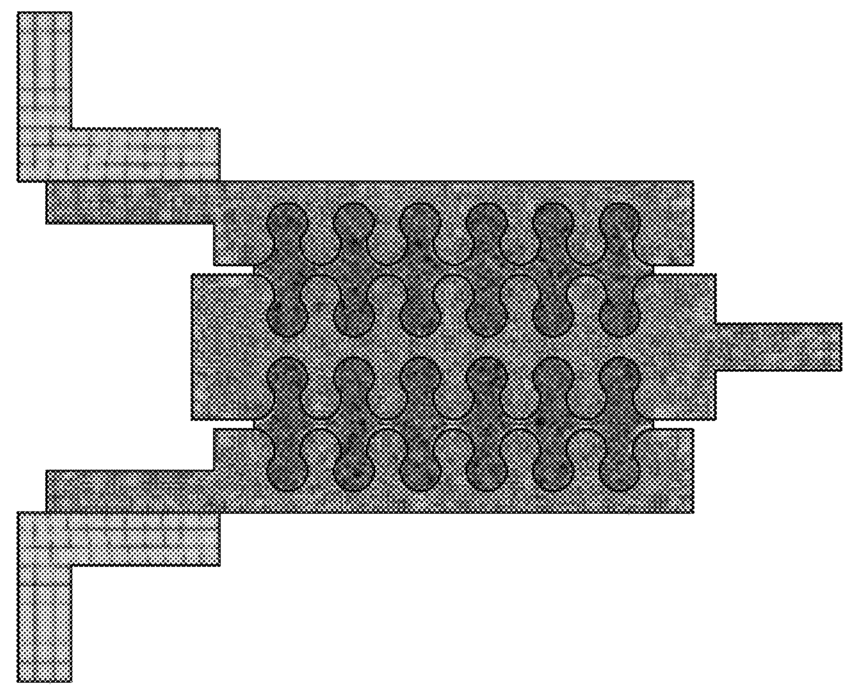
FIGS. 8A and 8B show Numerical model of MIVED (a) mesh details (b) boundary conditions.

A 2D model of the device was analyzed using the FE method to further explore the effect of geometrical and mechanical factors on the performance of the device. The behavior of the model was first compared to experimental behavior for validation. Then a parametric study was conducted on the geometry of the jigsaw pattern to understand the effect of each parameter on the energy dissipation of the device. A 4-node bilinear plane strain quadrilateral, hybrid, constant pressure element (CPE4H) was used for TPU. As for the steel parts, a 4-node bilinear plane strain quadrilateral (CPE4) was used. The minimum mesh size for the TPU was 0.65 mm, whereas for the flanges and the center plate, the mesh near the interface was refined to a minimum of 1.25 mm. The global mesh size for the single-angle connection was 4.8 mm. Surface-to-surface contact was used between the two phases, assuming no friction between interfaces due to the smooth surface of the steel part. The contact between the soft and rigid interfaces was modeled using a penalty method that approximates a hard contact. The penalty method helps reducing the number of iterations so that the simulation is less computationally expensive than a hard pressure-overclosure behavior. In this method, the contact forces are proportional to the penetration distance as opposed to the hard contact method where a zero-penetration condition is applied. FIG. 8 shows the FE model developed for the device.

Figure 8B:
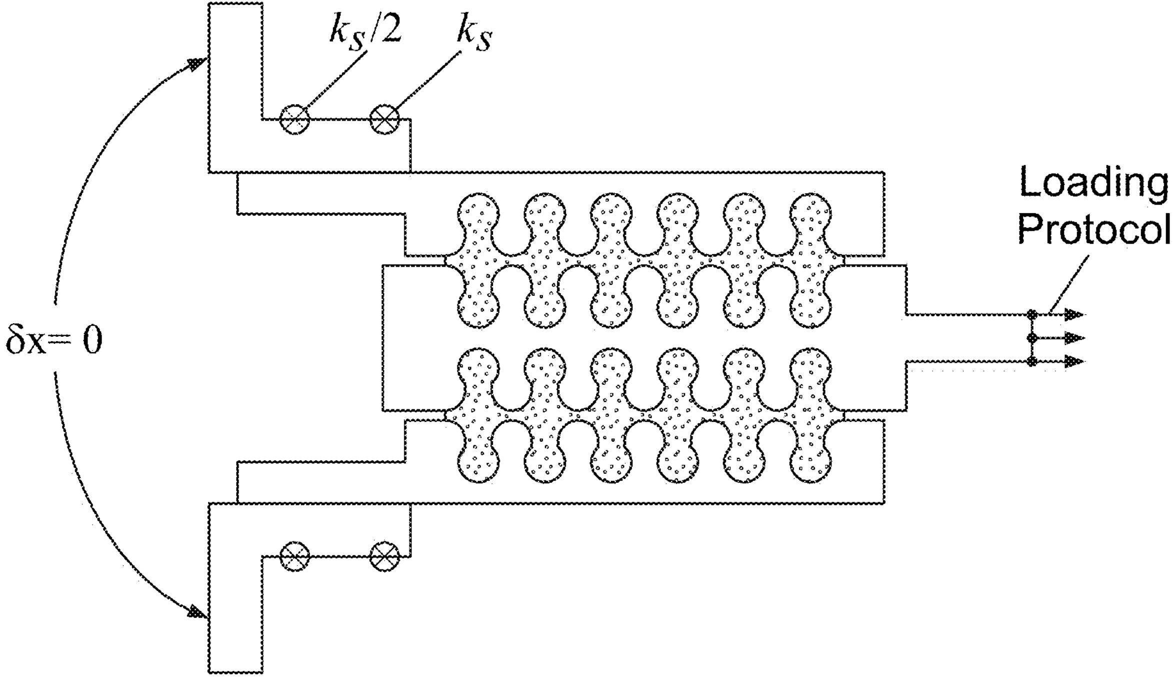

All the simulations were run under quasi-static cyclic loading conditions using ABAQUS implicit solver. The load was applied on the center plate in a displacement-controlled mode using the loading protocol applied to the MIVED. Since multiple modes of deformation are triggered in the TPU part, it was not possible to achieve a normalized displacement value (strain) for all models. Therefore, the maximum imposed displacement used was 5.0 mm displacement for all models. The boundary conditions of the experiment were simulated by rigidly connecting the flanges to the base angles. The base angles were restrained in the longitudinal direction (x-direction). In addition, the lateral movements and rotation of the device were partially restrained by introducing two lateral springs for each base angle with stiffness $k_s$=300 kN/mm in the y-direction as shown in FIG. 8B. Similar approach has been used in the literature to model the components of angle connections. Artificial geometrical imperfections were introduced to the soft part of the model to simulate the gaps between the soft and rigid parts in the experiment and the associated reduction in the contact area. The imperfections were modeled by introducing a reduction factor of 0.1×R to the interlocking geometry.

The stress-strain relationship in a viscoelastic polymeric material can be expressed using the Boltzmann superposition principle as follows:

$$\tau(t) = \varepsilon(t)G_0 + \int_0^t G(t-\rho)\frac{d\varepsilon(\rho)}{d\rho}d\rho \tag{1}$$

where τ(t) is the shear stress at time t, $$\frac{d\varepsilon(\rho)}{d\rho}$$

is the shear strain rate at time ρ, G(t−ρ) is the relaxation modulus, and t and ρ are time variables that constitute the entire strain history of the material. ε(t) and $G_0$ are the strain at time t and instantaneous modulus, respectively. Eq. (1) consists of two parts, the first term on the right-hand side of the equation is used to represent hyperelastic stresses, while the second term represents viscoelastic stresses. The elastic response of TPU was modeled using a hyperelastic rate-independent constitutive model to account for the large deformations it undergoes. Whereas a viscoelastic constitutive model that represents the internal damping of the material was used to characterize the rate-dependent response. The influence of temperature was not considered in the proposed material model. The material is assumed to be an isotropic incompressible solid which is appropriate for elastomers and elastomer-like materials, especially in applications where the material is not highly confined.

For hyperelastic coefficients, the reduced polynomial strain energy function, which is a particular form of the polynomial function, is given by:

$$W = \sum_{i=1}^{N} C_{i0}(\bar{I}_1 - 3)^i \tag{2}$$

where $C_{i0}$ is a material parameter and $\bar{I}_1$ is the first deviatoric strain invariant. The linear viscoelastic behavior can be described numerically by fitting normalized stress relaxation data using a Prony series:

$$g_R(t) = 1 - \sum_{i=1}^{N} g_i\left(1 - e^{\frac{t}{\tau_i}}\right) \tag{3}$$

The reduced polynomial parameters containing relaxation coefficients can be calculated as:

$$C_{ij}^R(t) = C_{ij}^0\left(1 - \sum_{i=1}^{N} g_i\left(1 - e^{\frac{t}{\tau_i}}\right)\right) \tag{4}$$

A parametric study was conducted to explore the effect of different geometrical parameters of the interlocks, shown in FIGS. 1 and 5 on the performance of the proposed MIVED design. The examined geometrical parameters are thickness of TPU (t), radius of interlocks (R), and angle between successive interlocks (θ). The effect of those parameters on the energy dissipation of the device was then examined. Each parameter impacts the performance of the device in a certain way. The change in thickness increases the amount of deformed TPU, which directly affects the energy dissipation of the device. The radius and angle are expected to influence the interlock performance of the device and the development of stress concentrations within the interlocking geometry. The energy dissipation efficiency is compared using a damping efficiency coefficient (η) as described by Eq. (5).

$$\eta = \frac{\int_0^{x_{max}} F_{Loading}dx - \int_0^{x_{max}} F_{Unloading}dx}{\int_0^{x_{max}} F_{Loading}dx}\% \tag{5}$$

The numerator is the energy dissipation of the device defined as the area enclosed by the mechanical hysteresis loop, while the denominator represents the input energy or the area under the loading curve only.

Figure 9:
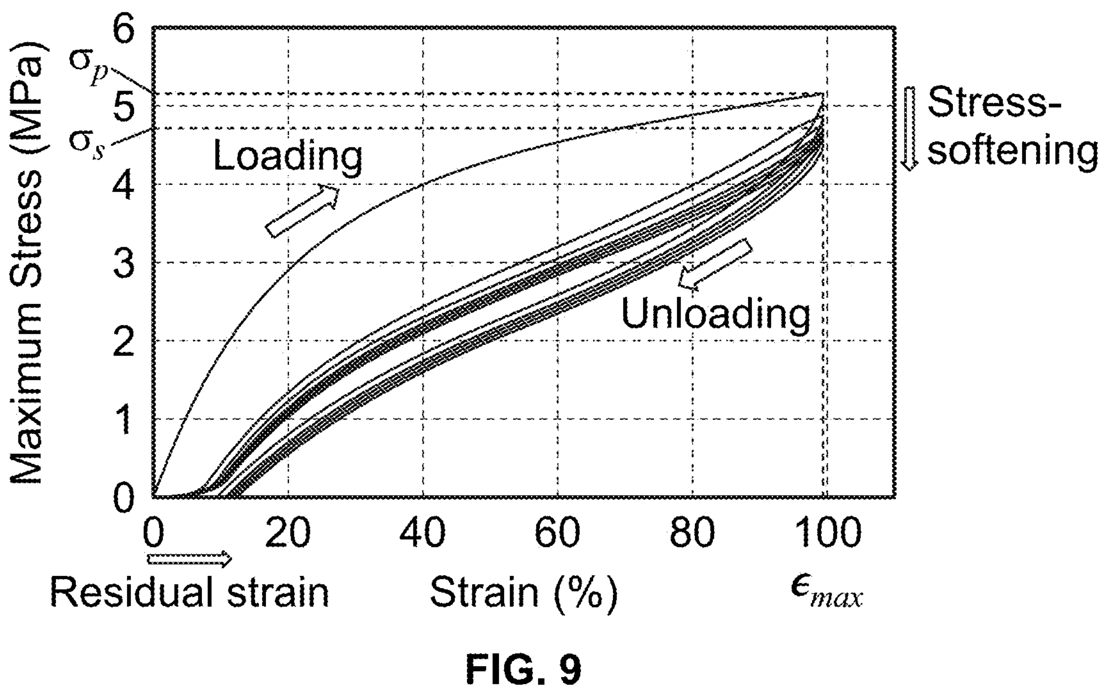
FIG. 9 shows the typical stress-strain response of 3D printed R45 (rectilinear infill pattern printed at an angle of 45° with respect to the damper longitudinal axis) TPU specimens in cyclic uniaxial tests.

All TPU specimens exhibited a non-linear behavior accompanied by inelastic effects such as stress-softening and residual strain when tested cyclically, as shown in FIG. 9. The cyclic response is divided into two parts: a primary response and a stable response. A primary response represents the first loading-unloading, and a stable response represents a loading-unloading cycle after which the hysteresis curve does not suffer from inelastic damage. In this case, the seventh cycle was considered as a stable response since the difference in the stress-strain response between this cycle and the subsequent cycles was insignificant.

The primary and stable responses are characterized by a maximum stress $\sigma_p$ and $\sigma_s$, respectively, and their corresponding elastic moduli extracted from the loading curve. The calculation of the elastic modulus in both primary and stable responses considered strains from 0-10%. The primary tensile modulus of 3D-printed R45 specimen, for example, was 19.2 MPa. Moreover, the primary tensile stress at a strain of 40% was 4.0 MPa, which is comparable to the value of 4.11 MPa. At higher strain level of 100%, the stress reached 5.05 MPa which is in agreement with the stress of 5.12 MPa. The agreement in the mechanical properties with the literature highlights the high-quality control in the production and testing of 3D-printed TPU. The dissipated energy was also evaluated by computing the area enclosed between the loading and unloading curves of the force-displacement response following the numerator of Eq. (5).

Figure 10A:
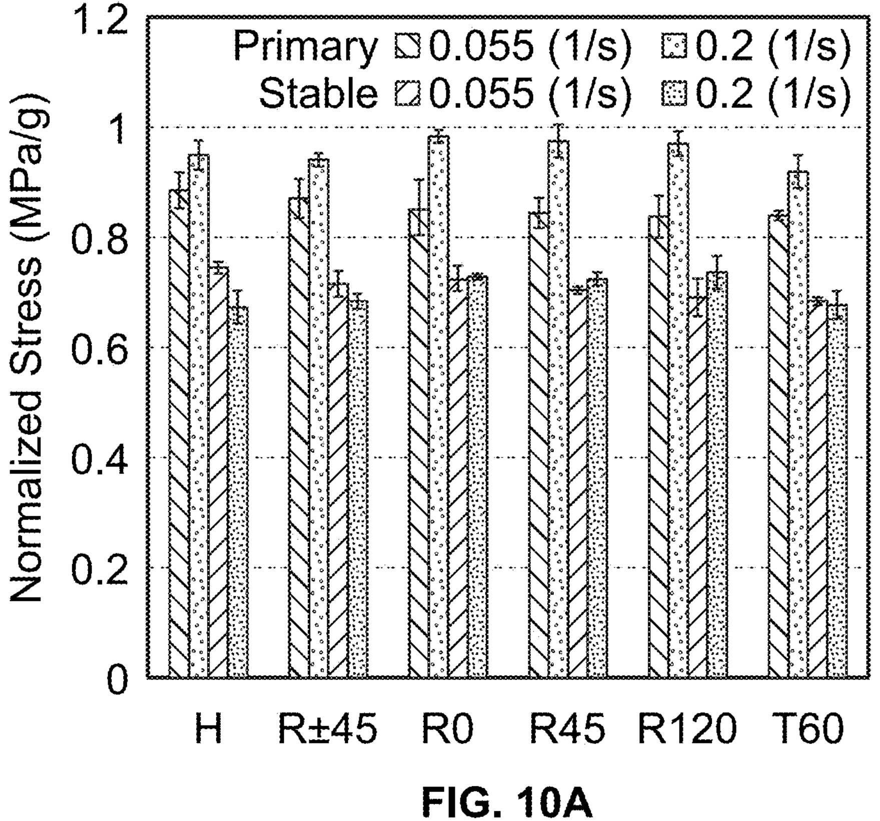
FIGS. 10A, 10B and 10C show normalized primary and stable responses of TPU specimens tested at different strain rates for (a) stress, (b) modulus, (c) dissipated energy.
Figure 10B:
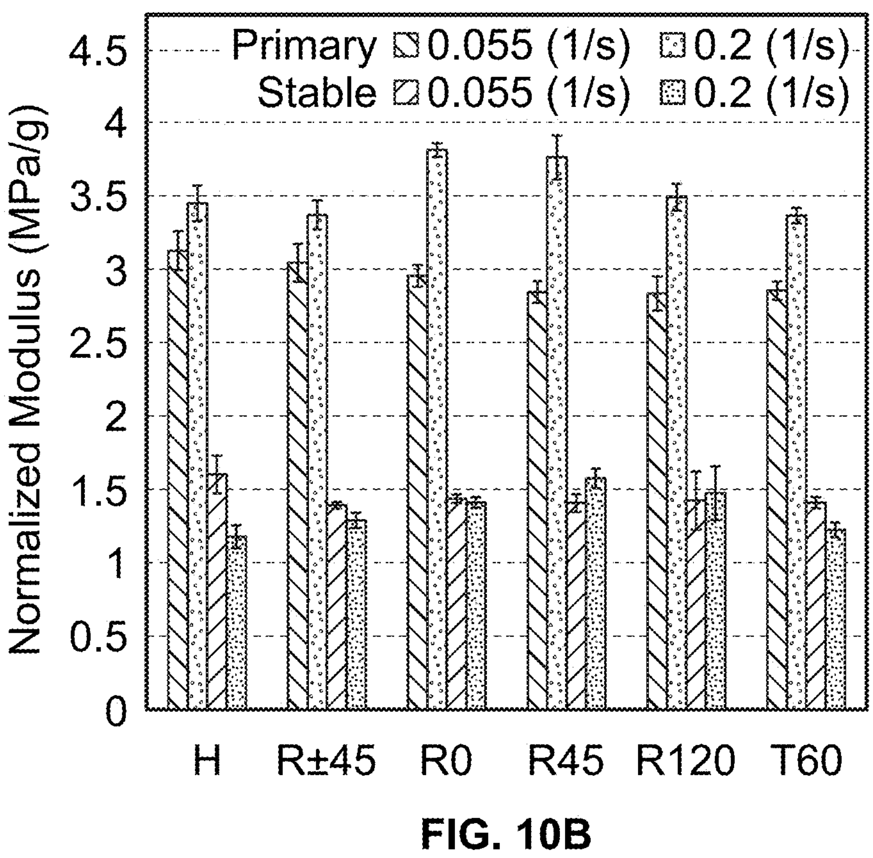
Figure 10C:
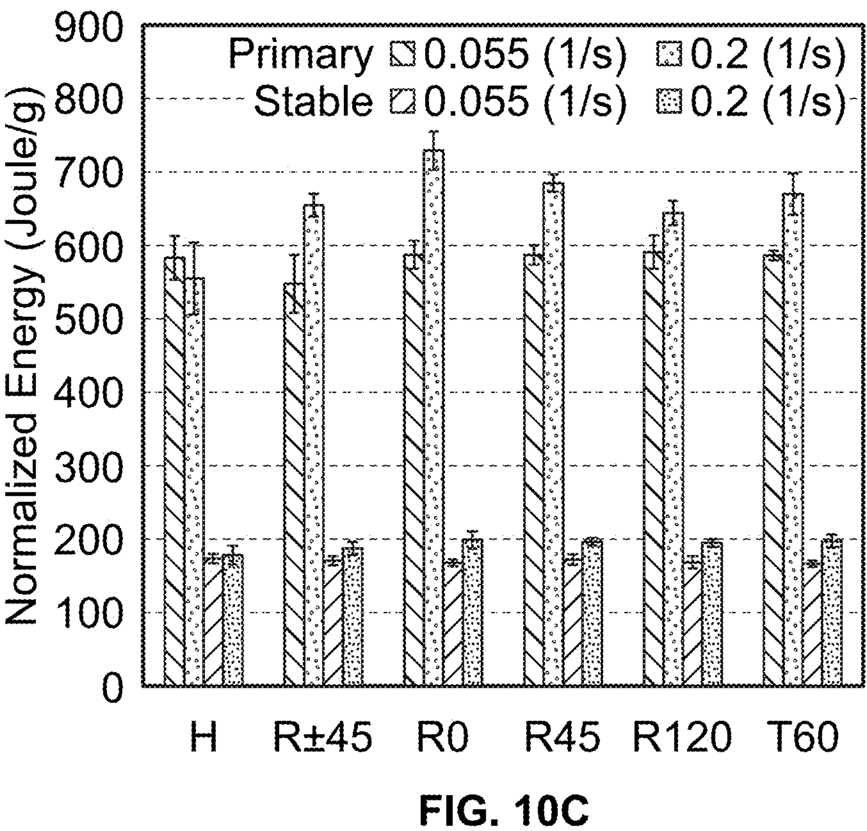

FIG. 10 shows the primary and stable responses of normalized stress, elastic modulus, and dissipated energy at two strain rates for all the tested specimens. The results show that increasing the strain rate causes the maximum stress and modulus in the primary responses to increase, whereas stable responses did not show a difference between rates. This can be explained by the sudden changes that occur to the microstructure of the entangled polymer chains. In the case of primary response, the polymer chains have insufficient time to orient abruptly to accommodate the applied macroscopic deformations. However, once the response stabilizes, the polymer chains have already been stretched and oriented in the loading direction, and therefore the rate effect that was evident in the primary response disappears. The energy dissipation, however, increased with increasing strain rate in both responses, primary and stable. On the other hand, the infill pattern does not show any effect on the stress, modulus, or energy dissipation. The results of the two-factor ANOVA test were in line with the observations. The rate was significant in stress and modulus only for the primary response, whereas it was significant in energy dissipation for both primary and stable responses; the infill pattern and rate-pattern interaction effects were statistically insignificant.

The insignificant effect of the infill pattern indicates that 3D printed TPU acts as an isotropic material with similar inelastic behavior regardless of the filament orientation. The normalization also showed that the infill density of the printed specimen is what governs its mechanical properties.

Ultimately, the R45 pattern was used to print the soft part of the MIVED because it demonstrated the best mechanical performance due to the high part density attained compared to other infill patterns.

Figure 11A:
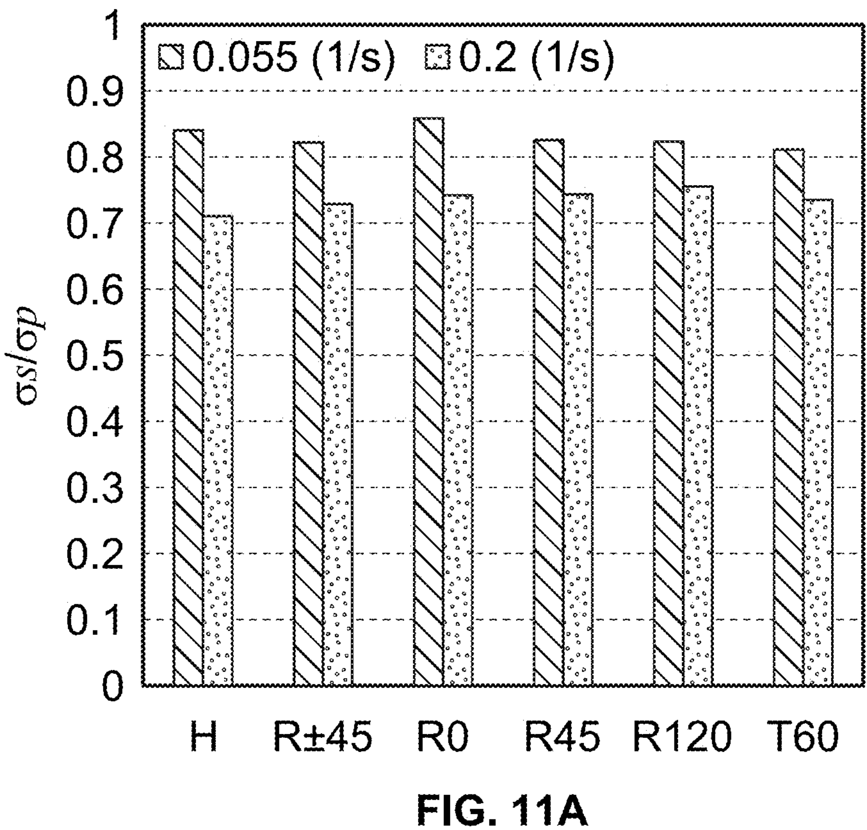
FIGS. 11A, 11B and 11C show stable/primary ratio for different infill patterns at two different rates for (a) stress (b) modulus, and (c) dissipated energy.
Figure 11B:
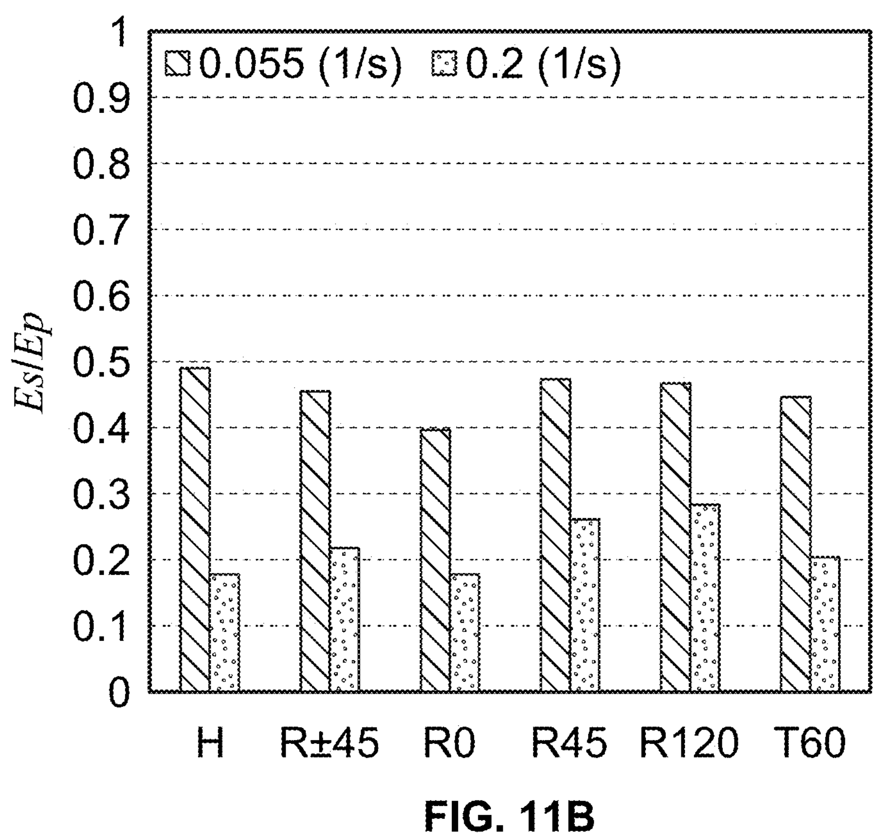
Figure 11C:
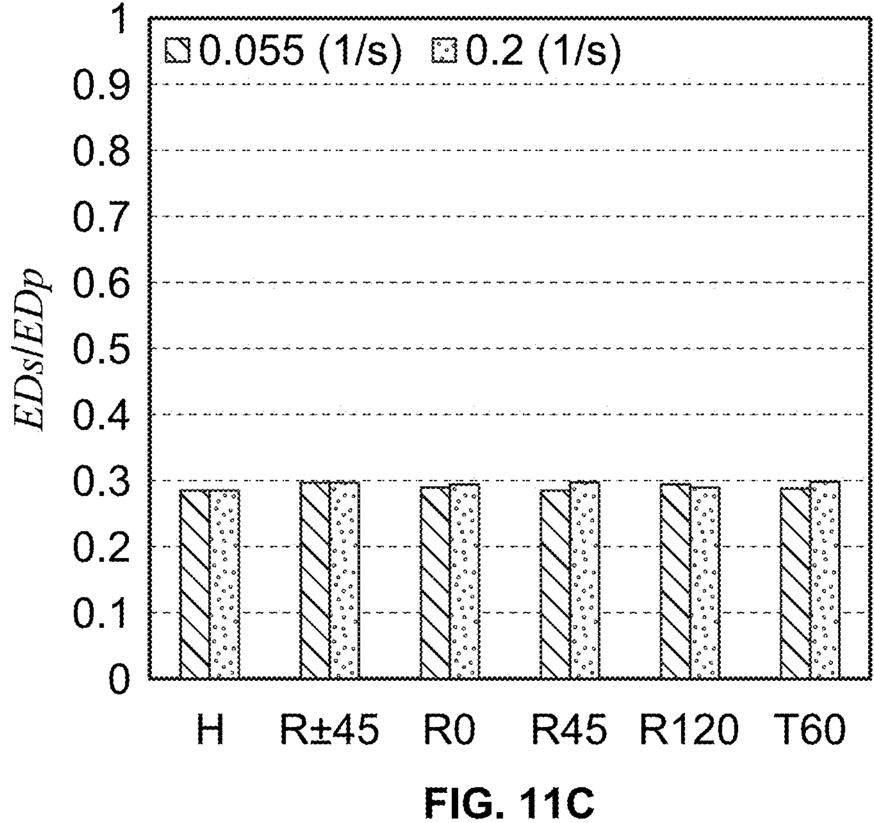

The effect of strain rate on the stable/primary ratio of the measured responses is shown in FIG. 11. It was observed that the ratio is independent of infill pattern for different mechanical properties and strain rates. However, the stable/primary ratio for stress and modulus dropped as the strain rate increased, whereas the energy dissipation ratio did not change. The influence of strain rates on stress and modulus relates to the ability of material to perform chain orientation when stretched. The lower the loading rate, the higher the ability for the polymer chains to orient in the loading direction, thus providing higher stiffness and capacity.

Figures 12A, 12B, 12C:
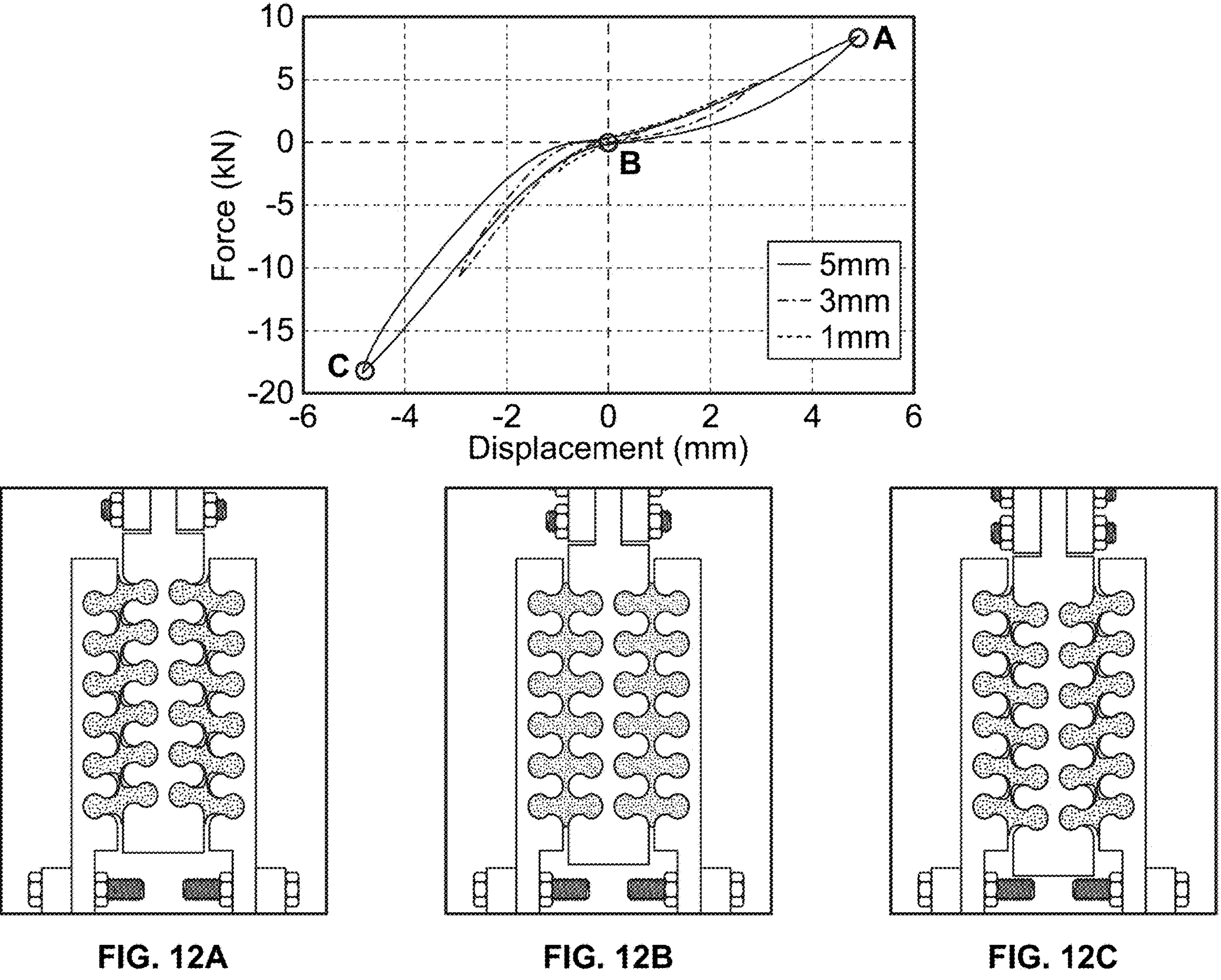
FIGS. 12A, 12B and 12C show MIVED test results showing push and pull movements showing the performance of the damper at the different load-displacement force profile.

FIG. 12 shows the hysteresis response of the device at 0.5 Hz frequency for different amplitudes of applied displacements. The figure shows that the device response is highly non-linear because of the TPU response, the interlocking nature of the device, and the gaps between the soft and rigid interfaces. It can be observed that the response of the device is not symmetrical in tension "Pull" and compression "Push", denoted by A and C, respectively, in FIG. 12. In both pull and push motions, it was observed that the segments of the TPU part that connects the interlocks together starts pushing the flanges outwards as they deform and come in contact with the steel. This caused the device to be stiffer in compression since it is being pushed toward the angle connection, which provides high restraint against lateral movement of the flanges. Whereas in tension, it is being pulled away from the connection, and the flanges have more freedom to rotate. This increase in the device stiffness in the push direction led to higher forces than in the pull direction. It was also observed that the change in amplitude affects the stiffness of the device in the push direction but not in the pull.

Figure 13A:
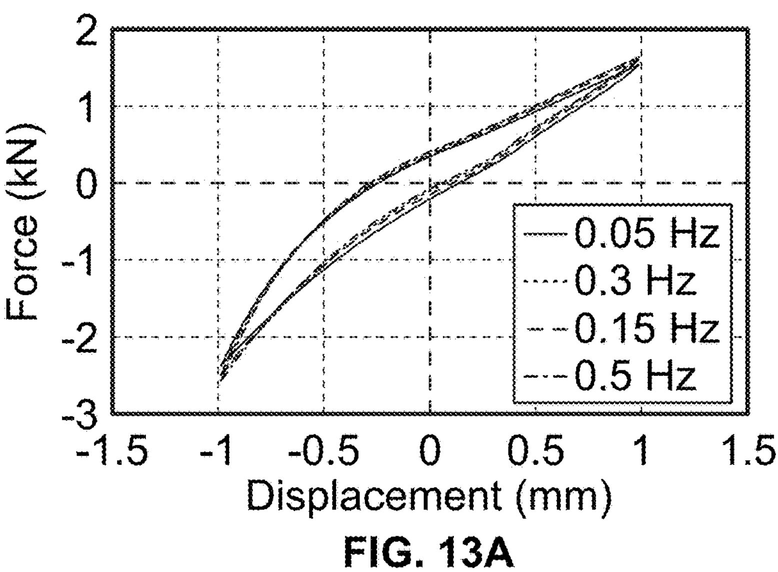
FIGS. 13A, 13B and 13C show MIVED test results at (a) 1 mm, (b) 3 mm, (c) 5 mm.
Figure 13B:
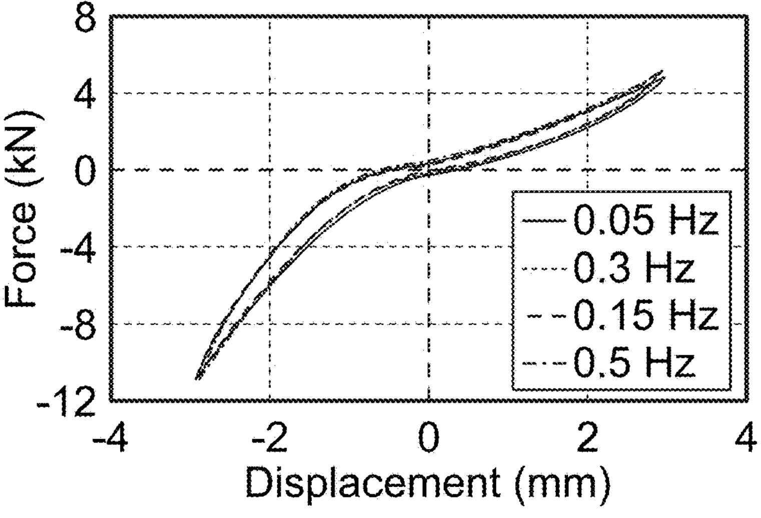
Figure 13C:
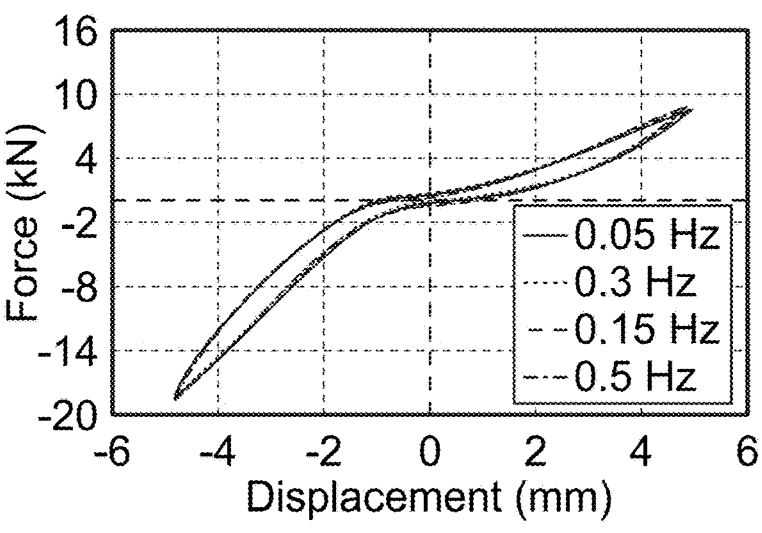

FIG. 13 shows that the stiffness of the device is not significantly affected by the change in frequency at this low-frequency range. It can be noticed that the response of the device at 1 mm amplitude is slightly different than the rest. The reason is the gap between the rigid and soft parts in the case of 1 mm amplitude is almost half the imposed amplitude, which does not help in developing the full behavior of the device seen at 3 mm and 5 mm amplitudes.

Figure 14A:
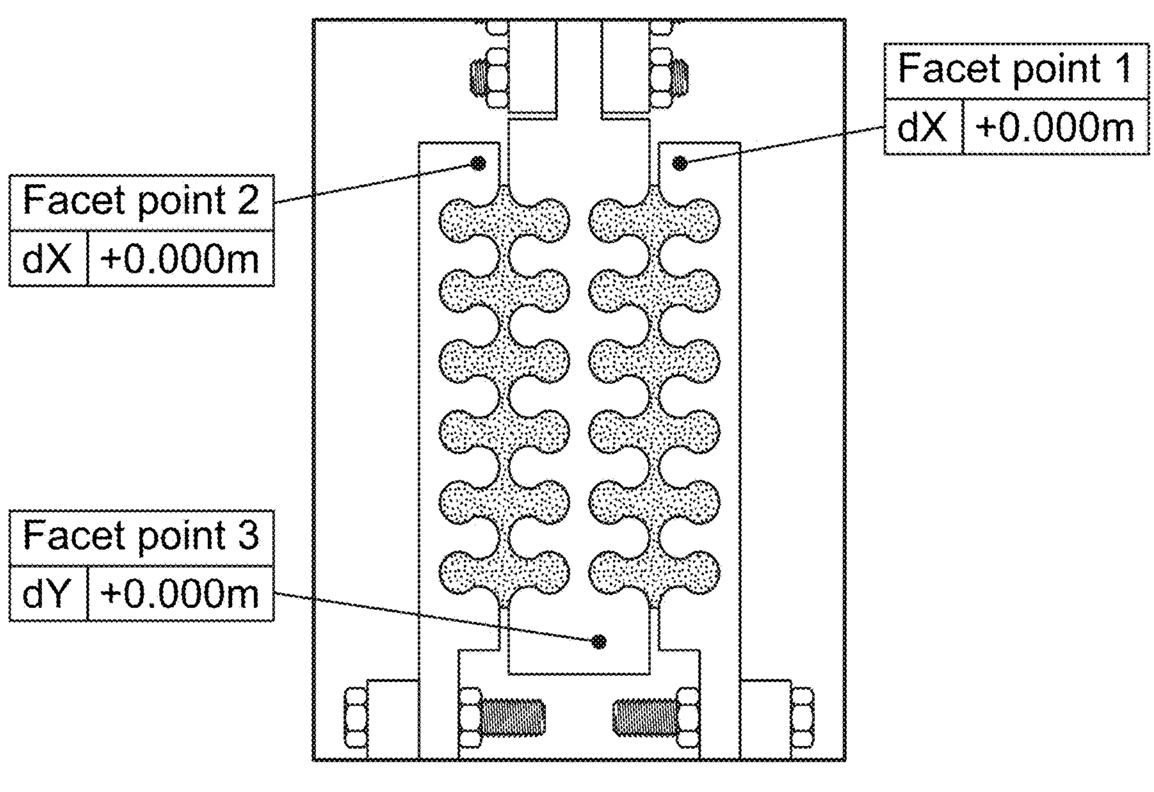
FIGS. 14A and 14B show force and displacements of MIVED (a) Facet points locations, (b) force, lateral displacement, and longitudinal displacement during one cycle—amplitude 5 mm at 0.5 Hz.
Figure 14B:
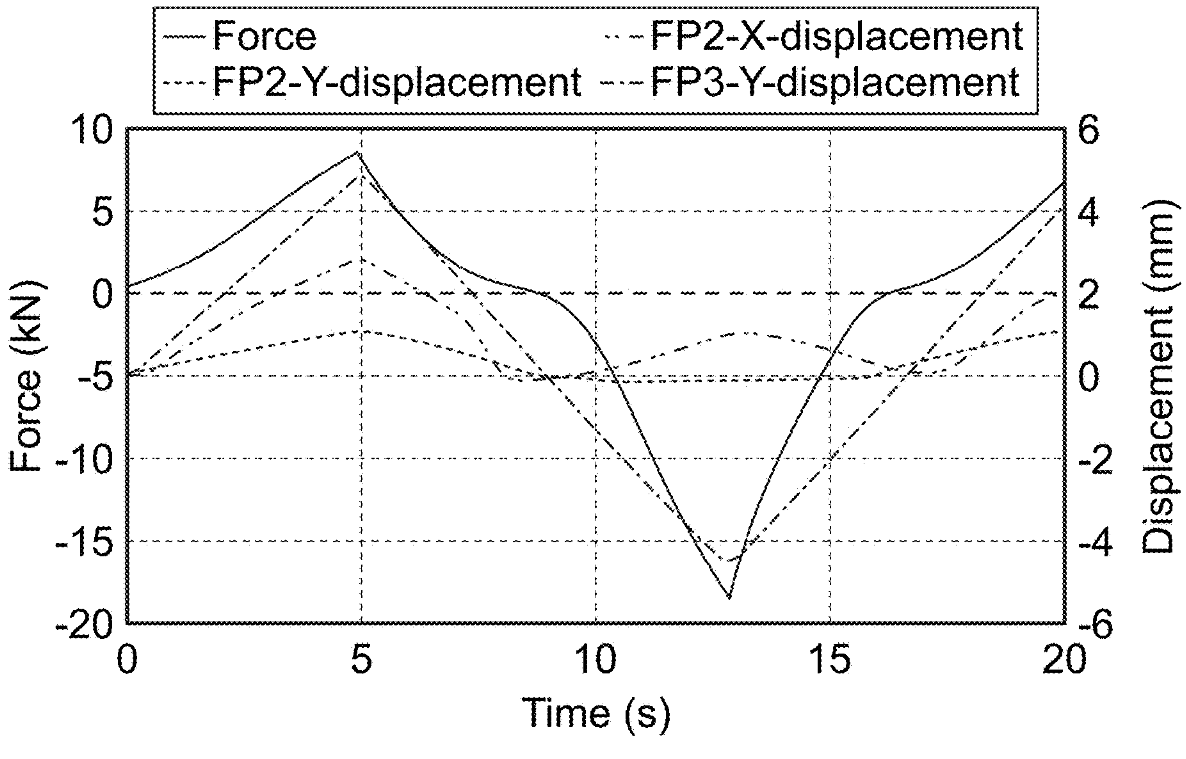

To further explore the effect of the pull and push movements on the response of the device, DIC was used to track the movement of the flanges and center plate as the device is being loaded. Facet points 2 and 3 (FP2 and FP3), shown in FIG. 14A, were tracked and the displacements in the longitudinal and transverse directions were recorded. FIG. 14B shows the force of the device and the X and Y displacements of FP2 and FP3 all plotted against time for a 0.5 Hz, 5 mm loading cycle. The first peak represents the pull motion, while the peak after represents the push motion. The displacements of the flange (FP2) indicate that the lateral and longitudinal displacements are increased in the pull direction resulting in lower maximum forces. On the other hand, loading the device in the push direction is associated with lower displacement and higher forces.

The damping efficiency of the MIVED was compared to conventional dampers made out of nitrile butadiene rubber (NBR) and silicon rubber (SR). The damping efficiency coefficient ($\eta$) described in Eq. 5 was used to evaluate the different dampers. The MIVED has adequate damping efficiency of 15% of the applied energy. However, it has lower damping efficiency than the rubber dampers. The MIVED damper showed 50% of the efficiency of the SR damper and about 30% of the NBR damper. The lower efficiency of the MIVD compared with other rubber dampers is mainly attributed to the use of TPU as thermoplastics with elastomeric-like behavior, which has lower damping efficiency than typical elastomers such as rubber materials.

The coefficients for the viscoelastic and hyperelastic material model of the TPU were obtained by fitting the experimental data. The stable response of the uniaxial tension test data at 0.055 1/s rates of the R45 infill pattern was fitted to a 6th order reduced polynomial strain energy function. The Prony series parameters, $g_i$ and $\tau_i$, were identified by performing a curve-fitting procedure on normalized stress relaxation tests. The coefficients of the hyperelastic and viscoelastic functions are shown in Tables 4 and 5 respectively.

TABLE 5

| Hyperelastic material model, reduced polynomial N = 6, coefficients | |
|---|---|
| i | $C_{i0}$ |
| 1 | 0.67 |
| 2 | 2.88 |
| 3 | −5.36 |
| 4 | 4.61 |
| 5 | −1.86 |
| 6 | 0.28 |

TABLE 6

| Prony series fit parameters | | |
|---|---|---|
| i | $g_i$ (MPa) | $\tau_i$ (s) |
| 1 | 0.26 | 0.44 |
| 2 | 0.12 | 24.56 |

Figure 15:
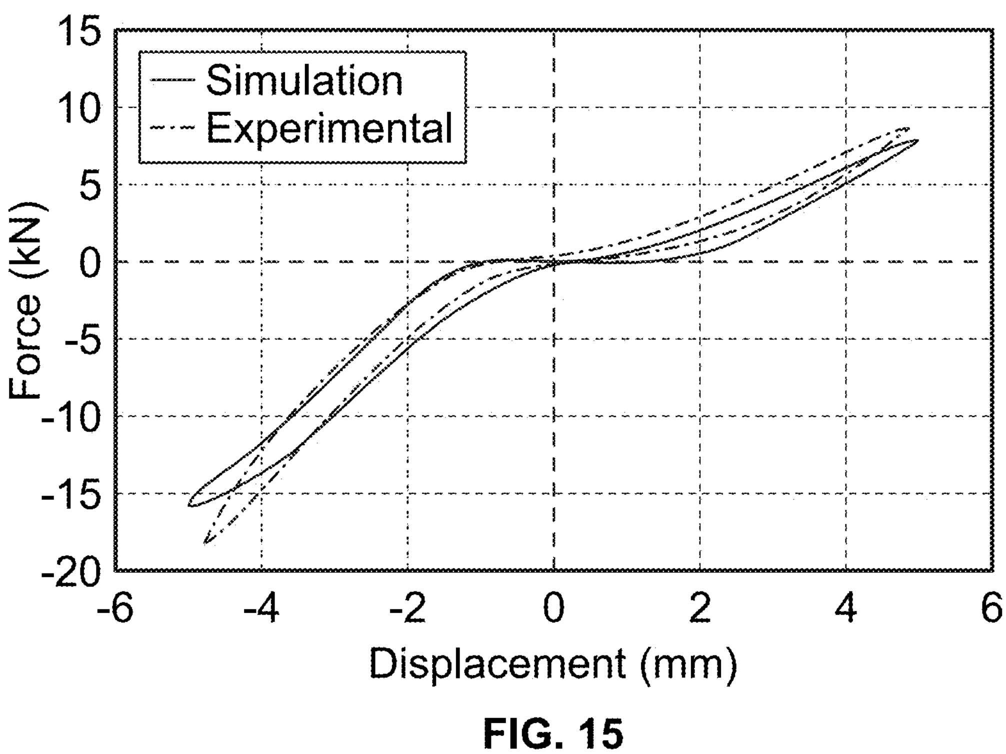
FIG. 15 shows experimental vs. numerical results for 5 mm amplitude at 0.5 Hz.

The experimental and numerical force-displacement curves of the reference device are shown in FIG. 15 for applied displacement with 5 mm amplitude at 0.5 Hz frequency. The results show relatively good agreement between the predictive model and the experiment. Table 6 presents a comparison of maximum force in pull and push and the total energy dissipation between the experiment and the numerical model. The numerical force values are fairly close to the experimental values (±10% error), while the energy dissipation values are within 1% of the experimental value. The differences between the two curves can be explained through multiple reasons. First, the artificial imperfections introduced in the simulation do not mimic the actual gaps between TPU and steel in the experiment due to randomness and machine-induced errors during fabricating the steel and TPU parts. Second, the quasi-static 2D model does not account for the inertial effects associated with cyclic loading and modes of deformation other than uniaxial such as biaxial and planar shear. However, the FE model can still capture the general deformation response of the MIVED device as can be observed when comparing the simulated behavior to the experimental one in FIG. 15.

TABLE 7

Numerical vs. Experimental results for the mechanical response of MIVED

| | Simulation | Experiment | Error (%) |
|---|---|---|---|
| ED (N · m)[a] | $1.50 \times 10^4$ | $1.49 \times 10^4$ | 0.66 |
| $F_{push}$ (kN)[b] | 15.91 | 18.24 | 12.8 |
| $F_{pull}$ (kN)[c] | 7.92 | 8.79 | 9.8 |

[a]Energy dissipation,
[b]Maximum push force and
[c]Minimum pull force

Figure 16A:
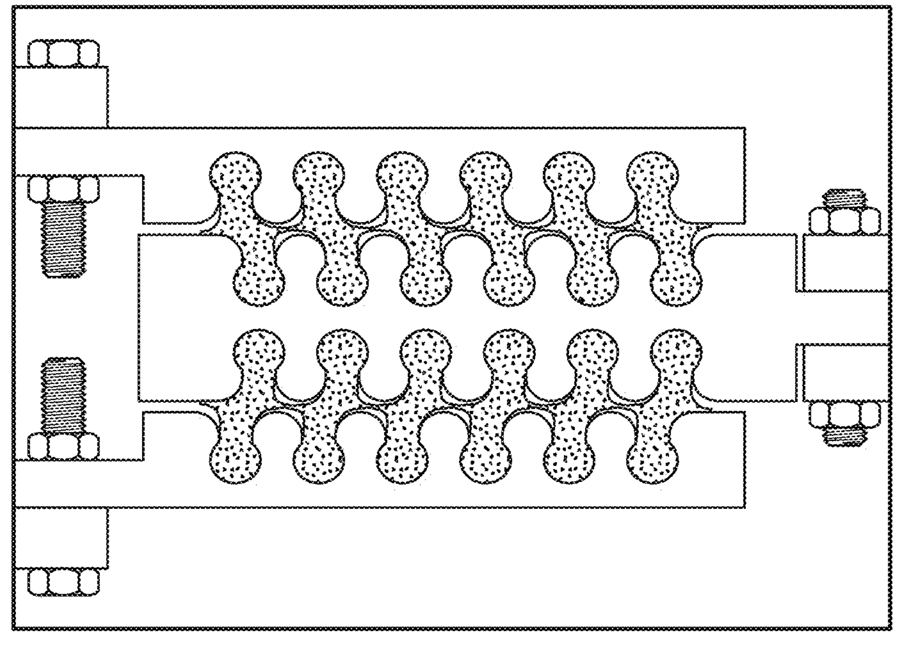
FIGS. 16A, 16B and 16C show pull behavior in MIVED at 5 mm amplitude and 0.5 Hz frequency (a) experimental behavior, (b) contact pressure in FE model, (c) shear strain in TPU part.
Figure 16B:
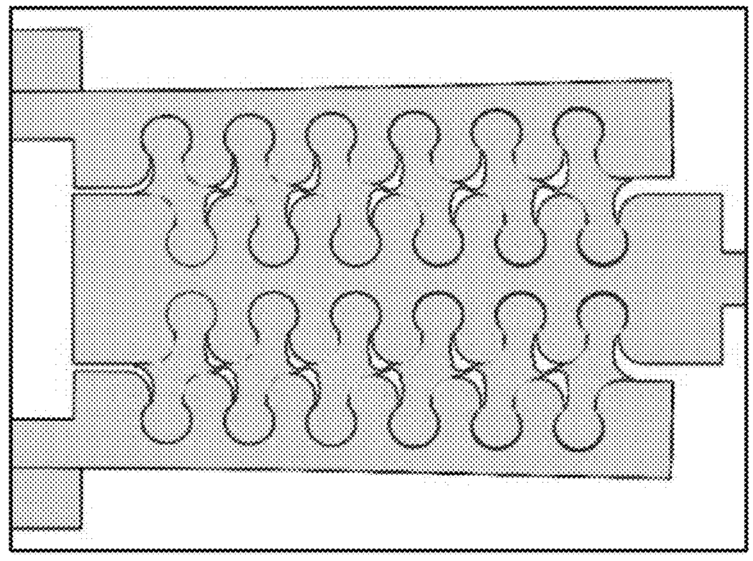
Figure 16C:
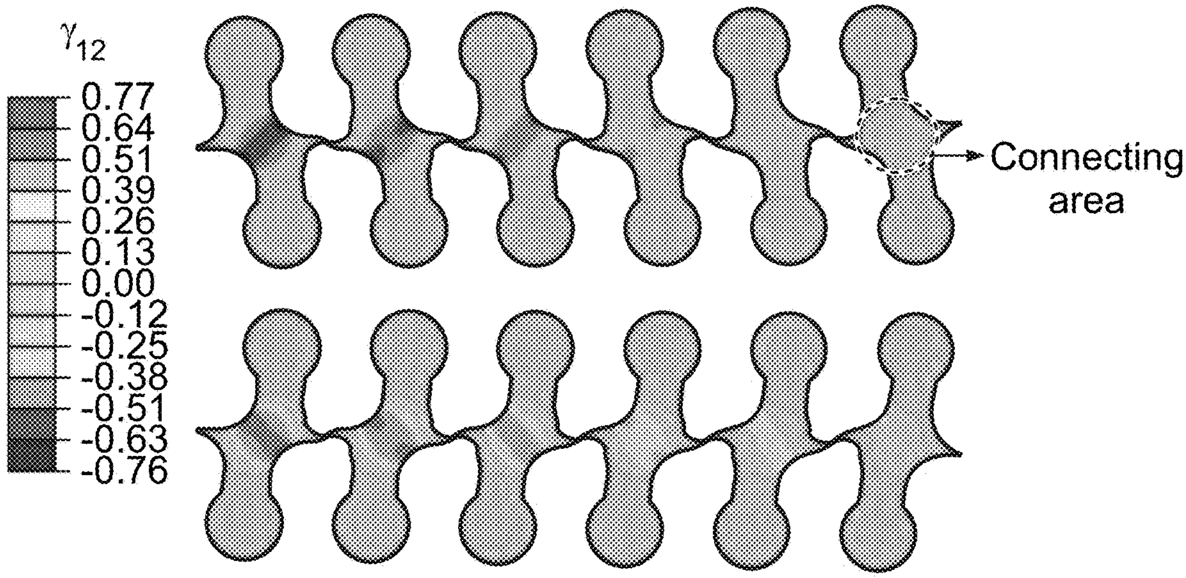
Figure 17A:
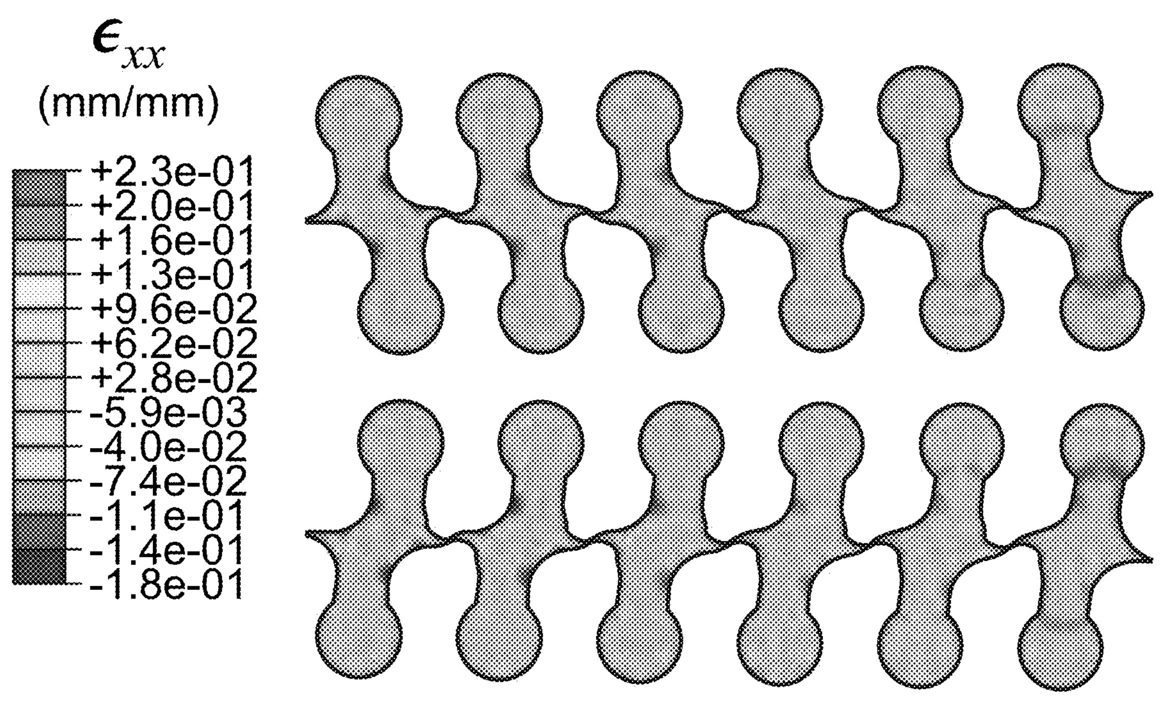
FIGS. 17A, 17B, 17C and 17D show axial strain of MIVED (a) $\epsilon_{xx}$ pull (b) $\epsilon_{xx}$ push (c) $\epsilon_{yy}$ pull (d) $\epsilon_{yy}$ push.
Figure 17B:
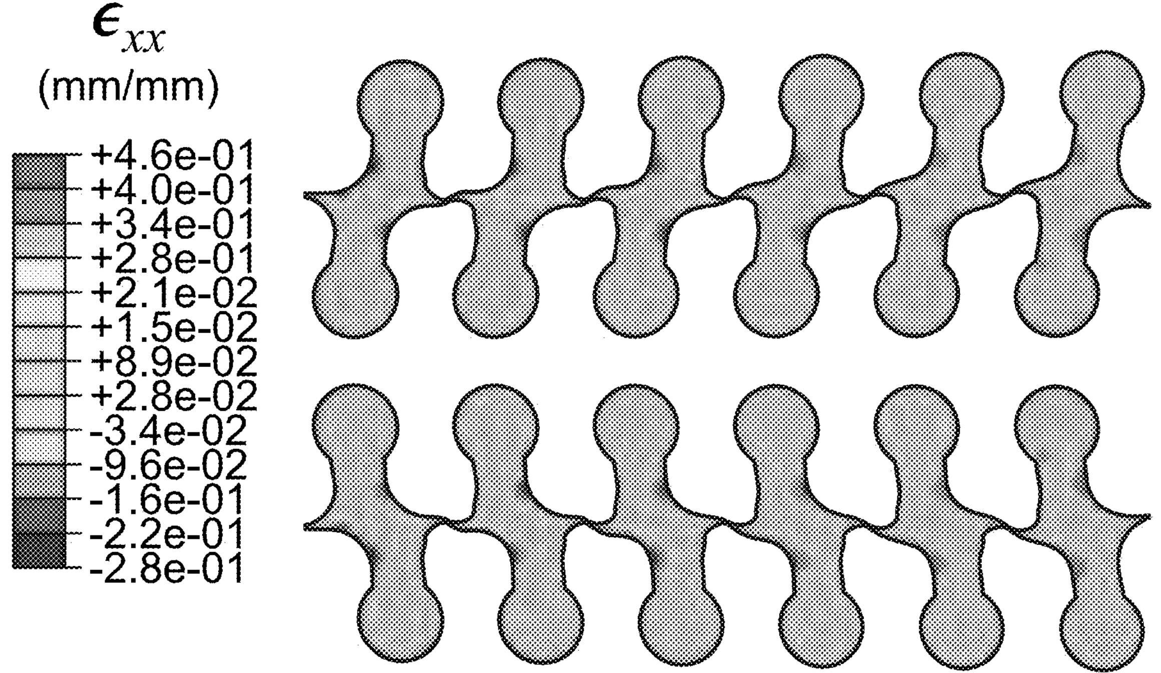
Figure 17C:
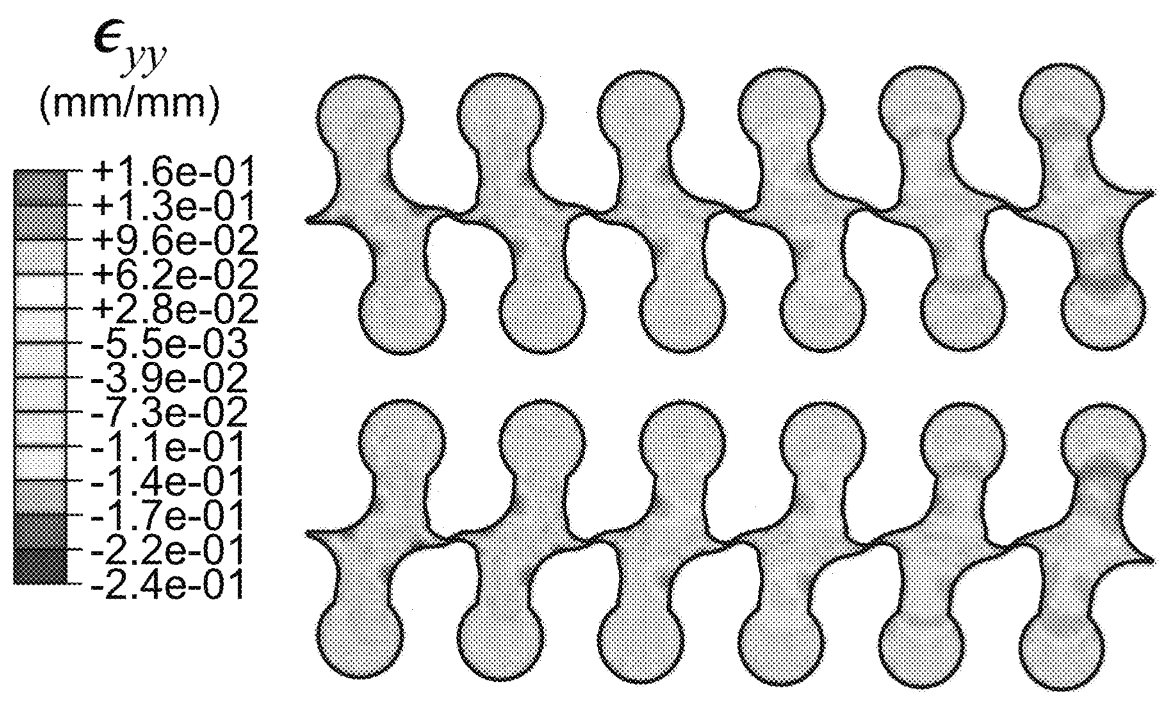
Figure 17D:
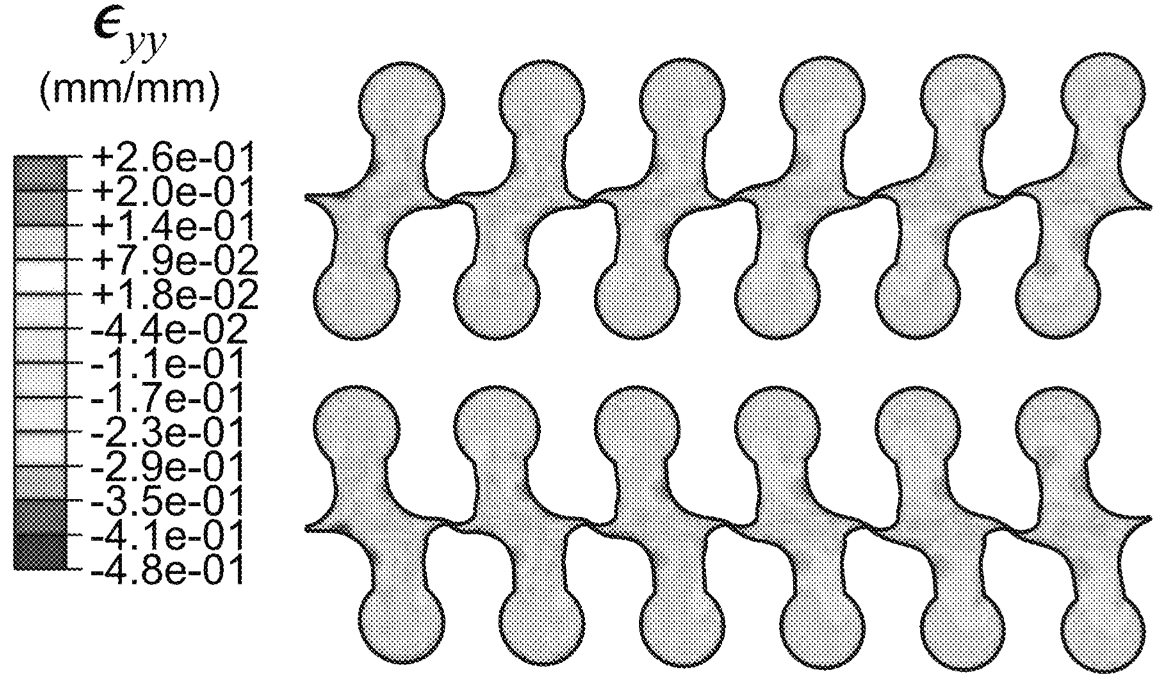

FIG. 16 shows the MIVED under pull load for 5 mm amplitude and 0.5 Hz frequency and the numerical contact pressure between and shear strain contours in TPU at the same loading conditions. The figure shows that the deformation of TPU in the FE model reasonably depicts the deformations observed experimentally in TPU. The contact pressure developed in the numerical model provides a good explanation of the experimental behavior of the device.

The simulation shows that the TPU is pushing the side flanges laterally away from the center due to the development of contact pressure between soft and rigid phases of MIVED. The contact pressure on the center plate from one side is canceled out by an equal and opposite pressure developed on the other sides. Moreover, the maximum strain in the TPU part, which corresponds to a shear strain of 115% during push loading, does not reach the failure strain value of this 3D printed TPU.

The simulations shown in FIG. 17 highlights the axial strain states in x and y directions (both tension and compression) that the TPU experience during pull and push. It is observed that the two TPU parts, top and bottom, in the damper undergo the same strains in all states but in opposite directions. Tensile and compressive strains are a direct consequence of the contact forces the TPU exerts on the rigid phase of steel. Tension is dominant in the y-direction, whereas compression is dominant in the x-direction. The simulation also shows that interlocks that are near the loading side are strained more than the ones close to the connection (support side) indicating a gradual transfer of forces between the solid phases. The stress states indicate that unlike conventional dampers, this device can dissipate energy through axial modes of deformation in addition to the conventional shear mode. The additional modes of energy dissipation help attain higher load capacity and higher damping efficiency compared with conventional dampers.

Comparison between the energy dissipation efficiency (η) for the MIVED geometrical parameters shows that the damping efficiency is higher for interlocks with lower radius. Moreover, there seems to be an optimum value for the radius that produces higher efficiency, which is 4 mm in this case. The radius of the TPU part is proportional to the connecting area of the part, shown in FIG. 16C, which is strained the most. Therefore, a lower radius with a smaller connecting area exhibits higher strains which makes it more efficient. Conversely, an increase in angle causes an increase in efficiency. In a similar manner, a higher interlocking angle in a TPU part leads to a smaller connecting area, which in turn leads to higher strains and, therefore, higher efficiency. On the other hand, the change in efficiency due to the increase in thickness is not very pronounced and can be considered negligible. As the TPU thickness increases, lower strains are exhibited by the TPU part because they deform less when compared to a part with a lower thickness. Nevertheless, the efficiency lost due to reduction in strain is compensated by the increase in thickness, which increases the connecting area, and consequently maintains similar efficiency levels.

Thickness does not contribute to the efficiency of the damper; therefore, it can be disregarded when considering the geometrical parameters of the device. Nevertheless, there is an advantage in using a higher thickness as it reduces the strains but maintains efficiency levels.

The interlocking design of the present invention has the ability to change the parameters of the interlocks, obtain an asymmetrical response of the device, and to induce axial modes of deformation, which all adds to the robustness of the device. The design also allows for the potential engagement of the flanges in the energy dissipation process by utilizing a more ductile material with appropriate damping efficiency.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. An energy dissipation mechanism for dissipating a force during a loading event comprising: a first plate and opposingly located second plate; a dampener located in between said first and second plates; said dampener is configured to deform nonlinearly when a load is applied to dissipate energy;

said dampener is interlocked with said first and second plates;

said dampener includes a plurality of flanges;

said first and second plates including a plurality of openings that match the configuration of said flanges;

said flanges seat within said openings to interlock said dampener with said first and second plates each of said flanges include a rounded distal end that seats within openings having the same rounded shape; and said flanges configured to rotate within said openings when a load is applied.

2. The energy dissipation mechanism of claim 1 wherein each of said flanges include a rounded distal end, and said openings of said first outer plate, said second outer plate, and said inner plate have the same rounded shape of said flanges, and said flanges configured to rotate within said openings when a load is applied.

3. The energy dissipation mechanism of claim 2 wherein said inner plater stays in place because of the symmetry of the contact forces acting on it from both sides when a load is applied.

4. The energy dissipation mechanism of claim 1 wherein said rotation of said flanges leads to multiple modes of deformation including uniaxial, biaxial, and shear.

5. The energy dissipation mechanism of claim 1 wherein said rotation of said flanges is in the out-of-plane axis.

6. The energy dissipation mechanism of claim 1 wherein said rotation of said flanges leads to multiple modes of deformation including uniaxial, biaxial, and shear.

7. The energy dissipation mechanism of claim 1 wherein said rotation of said flanges is in the out-of-plane axis.

8. An energy dissipation mechanism for dissipating a force during a loading event comprising: a first outer plate and an opposingly located second outer plate; an inner plate located in between said first and second outer plates; a first dampener located in between said first outer plate and said inner plate; a second dampener located in between said second outer plate and said inner plate; said dampeners configured to deform when a load is applied to dissipate energy;

said dampener is a viscoelastic material;

said first dampener is interlocked with said first outer plate and said inner plate;

said second dampener is interlocked with said second outer plate and said inner plate;

said dampeners include a plurality of flanges;

said first and second outer plates and said inner plate including a plurality of openings that match the configuration of said flanges;

said flanges seat within said openings to interlock said dampeners with said first and second outer plates as well as said inner plate, each of said flanges include a rounded distal end;

said openings of said first outer plate said second outer plate and said inner plate have the same rounded shape of said flanges; and said flanges configured to rotate within said openings when a load is applied.

* * * * *